US011084362B2

(12) United States Patent
Jung

(10) Patent No.: US 11,084,362 B2
(45) Date of Patent: *Aug. 10, 2021

(54) ADJUSTABLE TONNEAU COVER

(71) Applicant: DROPTOP LLC, Newport Beach, CA (US)

(72) Inventor: Edmund Jung, Chatsworth, CA (US)

(73) Assignee: Droptop, LLC, Newport Beach, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 16/724,242

(22) Filed: Dec. 21, 2019

(65) Prior Publication Data

US 2020/0122557 A1 Apr. 23, 2020

Related U.S. Application Data

(63) Continuation-in-part of application No. 16/004,367, filed on Jun. 18, 2018, now Pat. No. 10,632,824.

(51) Int. Cl.

| B60J 7/04 | (2006.01) |
|---|---|
| B60P 7/02 | (2006.01) |
| B60J 7/14 | (2006.01) |
| B62D 33/08 | (2006.01) |
| B60J 7/16 | (2006.01) |

(52) U.S. Cl.
CPC ............ *B60J 7/1614* (2013.01); *B60J 7/041* (2013.01); *B60P 7/02* (2013.01); *B62D 33/08* (2013.01)

(58) Field of Classification Search
CPC ... B60J 7/041; B60J 7/042; B60J 7/047; B60J 7/1607; B60J 7/1614; B60J 7/141; B60P 7/02; B62D 33/02
See application file for complete search history.

(56) References Cited

U.S. PATENT DOCUMENTS

| 3,765,717 A * | 10/1973 | Garvert | B60J 7/141 |
| | | | 296/100.07 |
| 6,435,594 B1 * | 8/2002 | Ekonen | B60J 7/041 |
| | | | 296/100.09 |
| 6,439,639 B1 * | 8/2002 | Branting | B60J 7/041 |
| | | | 280/423.1 |
| 7,131,684 B1 * | 11/2006 | Gooding | B60J 7/141 |
| | | | 296/100.09 |
| 10,632,824 B2 * | 4/2020 | Jung | B60J 7/1607 |
| 10,889,168 B2 * | 1/2021 | Jung | F16C 29/008 |
| 2010/0308617 A1 * | 12/2010 | Golden | B60J 7/141 |
| | | | 296/39.2 |
| 2020/0122557 A1 * | 4/2020 | Jung | B62D 33/08 |

* cited by examiner

*Primary Examiner* — Gregory A Blankenship

(57) ABSTRACT

A moveable tonneau cover includes multiple wheels and multiple hinge elements. A tonneau cover mechanism includes multiple tracks each including an upper portion and a lower portion, and a switch that transitions to connect with the upper portion and the lower portion based on a weight of the movable tonneau cover such that the moveable tonneau cover is configured to move between a first position above a truck bed and a second position above the first position.

20 Claims, 25 Drawing Sheets

ADJUSTABLE TONNEAU COVER

CROSS-REFERENCE TO RELATED APPLICATIONS

This application is a continuation-in-part application of U.S. patent application Ser. No. 16/004,367, filed Jun. 9, 2018, which is incorporated herein by reference in its entirety.

BACKGROUND

Tonneau covers for truck beds provide secure storage for items in the truck bed. Conventionally, tonneau covers are rigid and may lift up from the top walls of a truck bed from one end to allow access to the truck bed. For placement of large items in a truck bed, a tonneau cover must be removed from the truck as it is not safe for trucks to be driven with a tonneau cover in a lifted-up state.

SUMMARY

One or more embodiments generally relate to adjustable tonneau covers for vehicles, such as pick up trucks. One embodiment includes a moveable tonneau cover that includes a plurality of wheels and a plurality of hinges. A tonneau cover mechanism includes a plurality of tracks each including an upper portion and a lower portion, and a switch that transitions to connect with the upper portion and the lower portion based on a weight of the movable tonneau cover such that the moveable tonneau cover is configured to move between a first position above a truck bed and a second position above the first position.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments generally relate to adjustable tonneau covers. In one embodiment, a moveable tonneau cover includes multiple wheels. A tonneau cover mechanism includes multiple tracks each including an upper portion and a lower portion, and a switch that transitions to connect with the upper portion and the lower portion based on a weight of the movable tonneau cover such that the moveable tonneau cover is configured to move between a first position above a truck bed and a second position above the first position.

Figure 1:
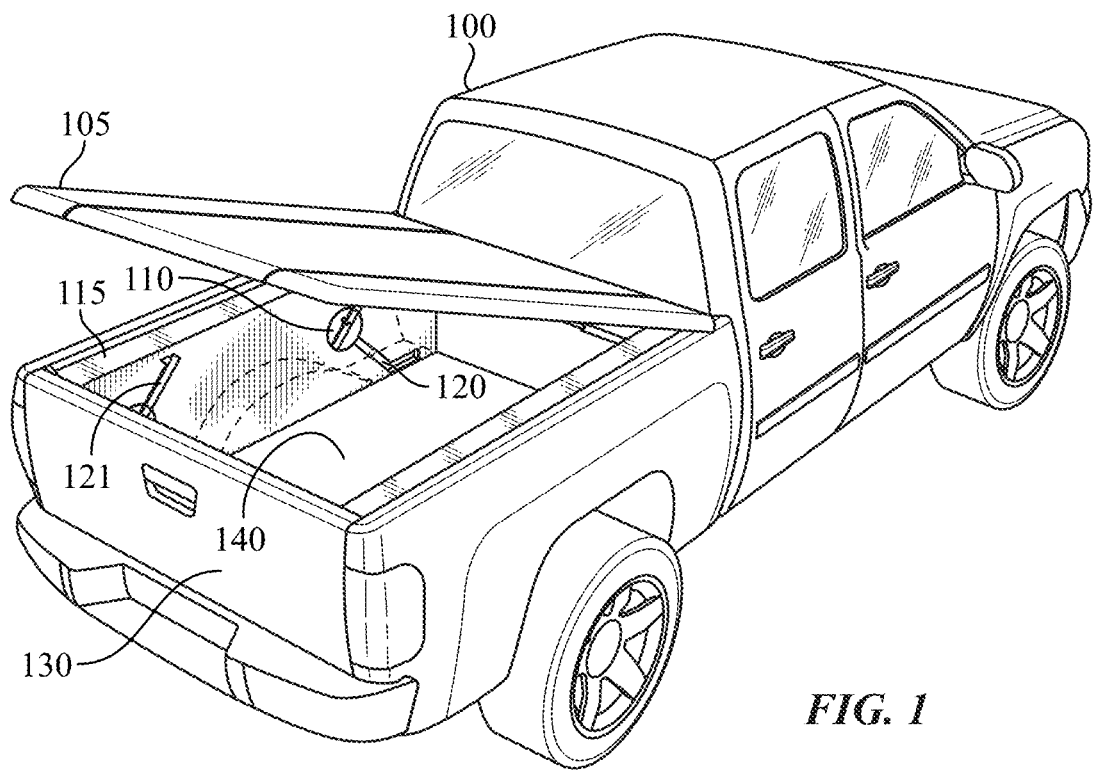
FIG. 1 shows an example truck coupled with a tonneau cover mechanism with the tonneau cover in a rotated and lifted state, according to some embodiments.

FIG. 1 shows an example truck 100 (i.e., a pick-up truck, truck with a storage bed, etc.) coupled with a tonneau cover mechanism (e.g., at least two sets of tracks (or rails) 120/121 (one set for each side of the truck sidewalls or storage compartments on the sides of the truck bed 140), a turret switch 110 (see also, FIGS. 10-18) for each rail, and wheel devices 510 (FIG. 5) for each rail) with the tonneau cover 105 in a rotated and lifted state, according to some embodiments. In one example, tonneau cover 105 is positioned at the top of the truck bed 140 at one end and lifted over the truck bed 140 and closed tailgate 130 (which may be opened in this state). This position of the tonneau cover is also referred to herein as position A. The tonneau cover mechanism has at least four wheels 510 (two sets of two wheels per set, where there are at least two wheels on either side of the tonneau cover 105), which allow tonneau cover 105 to be lowered through the tracks 120/121 (on both sides of the truck bed 140, and the turret switches 110. The tonneau cover 105 while in this position is unitized and supported in a U-frame (or channel) 530 (FIG. 5) that is hinged (including removable hinges or may become unhinged from hinges) and supported by gas pressurized struts (or shocks, etc.) for ease of raising and lowering the tonneau cover 105 using the hinges. This allows the tonneau cover 105 to be tilted up towards the front of the pickup truck bed 140. In one embodiment, the U-frame 530 may be part of the tracks 120/121 either as connected components or unitary. In one embodiment, the U-frame 530 or tracks 120/121 includes an opening or channel for the wheels 510 to move through when the tonneau cover 105 is raised to position A. In one embodiment, the wheels 510 may be replaced with rods, rollers or long axles that may be a single component with a length to fit in both opposite tracks 120 or 121 through the tonneau cover 105 (or underneath the tonneau cover 105), or separate rods, rollers or long axles connected to the tonneau cover 105.

In one embodiment, the tonneau cover 105 may have a width that covers the sidewalls of the truck bed 140 with removable tonneau side covers, rotatable side covers, etc. In some embodiments, the tonneau cover 105 moves up and down using the tonneau cover mechanism with the tonneau cover 105 having a width suitable for being lowered over the truck bed 140 between wheel wells. In some embodiments, the truck bed 140 may include side storage compartments that may cover the wheel wells. In these embodiments, the tracks 120/121 may be formed, included, attached to, etc. the sides of the storage compartments within the truck bed 140. In other embodiments, the tracks 120/121 may be formed, included, attached to, etc. side portions 115 of the truck bed 140. In some embodiments, the tonneau cover 105 may include hinged flaps to enable passage of the tonneau cover 105 past wheel wells (covers) which may include locks (not shown) for preventing access when the tonneau cover 105 is in position B.

In some embodiments, the tonneau cover 105 may be raised or lowered manually by a user applying force to move the tonneau cover 105 in the tracks 120/121. In other embodiments, electric motors, electro-magnets, electro-hydraulics, etc. may be used to raise and lower the tonneau cover 105, using sensors (e.g., distance, pressure, light, etc.) to check for objects, obstruction, etc. when the tonneau cover 105 is lowered toward the truck bed 140. In some embodiments, the tonneau cover mechanism for the tonneau cover 105 may include a kit for existing conventional tonneau covers. In other embodiments, the tonneau cover mechanism for the tonneau cover 105 may be included in original equipment produced by a truck manufacturer.

In some embodiments, the tonneau cover mechanism, the tonneau cover 105 includes a perimeter which conforms to a truck bed perimeter. It should be appreciated, however, that the tonneau cover 105 may be of any configuration or shape abuttable with the truck bed and side walls for enabling use of the truck for carrying loads (not shown) on top of the tonneau cover 105 in position C in the manner of a conventional pickup truck without the tonneau cover 105.

In some embodiments, the tonneau cover mechanisms may include bracing, vibration reducing elements (e.g., rubber bushings, coatings, etc.), and access openings (e.g., for cleaning, removing debris, etc.). In some embodiments, the tonneau cover mechanism components are made of weather resistant materials to prevent rust, corrosion, weather damage, etc.

Figure 2:
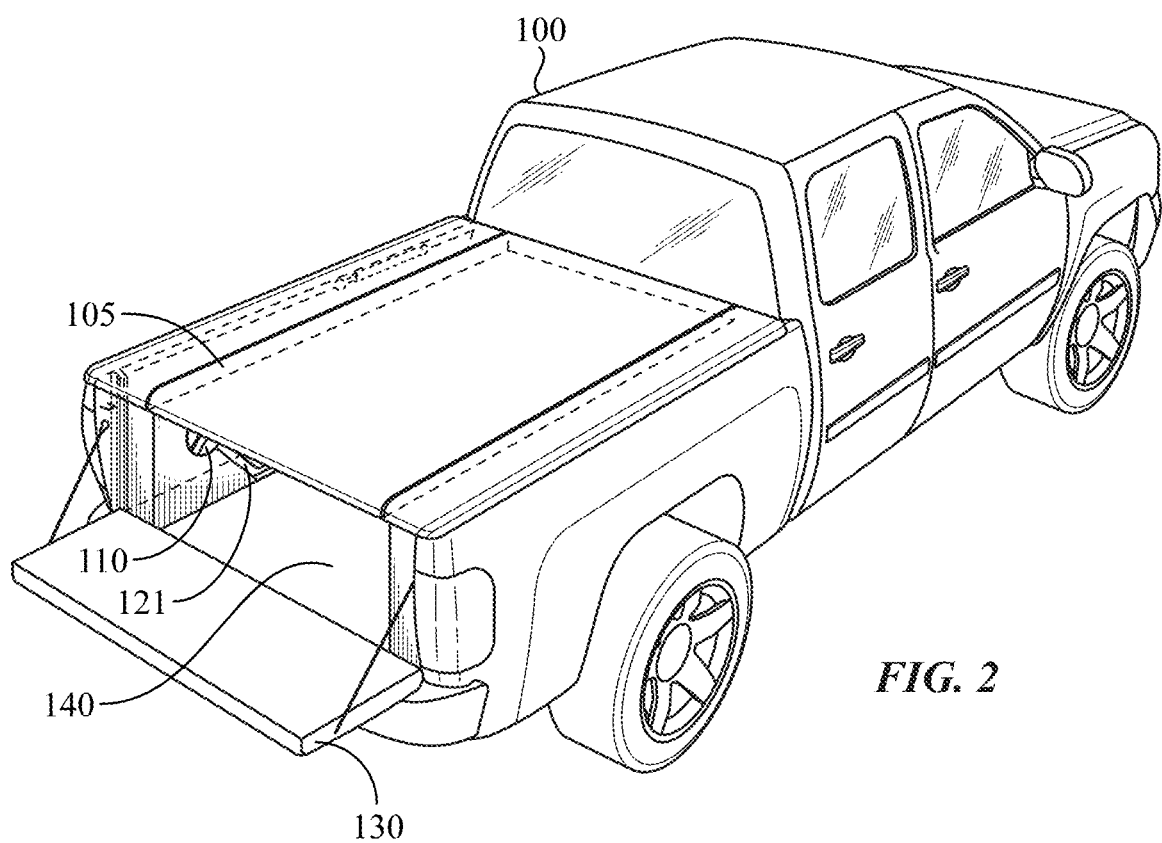
FIG. 2 shows an example truck coupled with a tonneau cover mechanism with the tonneau cover in a cover state above the truck bed of the example truck, according to some embodiments.

FIG. 2 shows the example truck 100 coupled with a tonneau cover mechanism with the tonneau cover 105 in a cover state (also referred to herein as position B) above the truck bed 140 and truck bed sidewalls of the example truck 100, according to some embodiments. In some embodiments, the material of the tonneau cover 105 may be similar to conventional tonneau covers, such as metal, fiberglass, hardened plastic, carbon fiber, etc. In one embodiment, the tonneau cover 105 may include a protective surface for placing objects directly on top of the tonneau cover 105. In other embodiments, a separate cover/sheeting of strong material may be used to cover the tonneau cover 105 for placing objects on the tonneau cover 105 when it is in a lowered position directly or closely positioned on top of the truck bed 140. In yet another embodiment, the tonneau cover 105 may have a contoured shell casing/covering that is removably coupled to the tonneau cover 105 for protecting the tonneau cover 105 when objects are placed on the tonneau cover 105. In some embodiments, the tonneau cover 105 may be covered with material such that matching paint/coloring/wrap/etc. to that of the truck 100. In some embodiments, the tonneau cover 105 is reversible with one side having a material that matches paint/color of the example truck 100, and the other side having material made for loading, carrying items, etc. (e.g., a stronger material than the first side, similar to truck bed protective liner material or coatings, etc.).

In some embodiments, the tailgate 130 may be opened/closed without having to move the tonneau cover 105. In other embodiments, the tonneau cover 105 may close over the tailgate 130 and may need to be raised in order for the tailgate 130 to be lowered or raised to a locked position.

In some embodiments, the tonneau cover 105 is removable from the U-frame 530 (FIG. 5) for removal of the tonneau cover 105. In one embodiment, the tonneau cover 105 may slide toward the tailgate 130 for access to the truck bed 140 at the opposite end of the tailgate 130.

Figure 3:
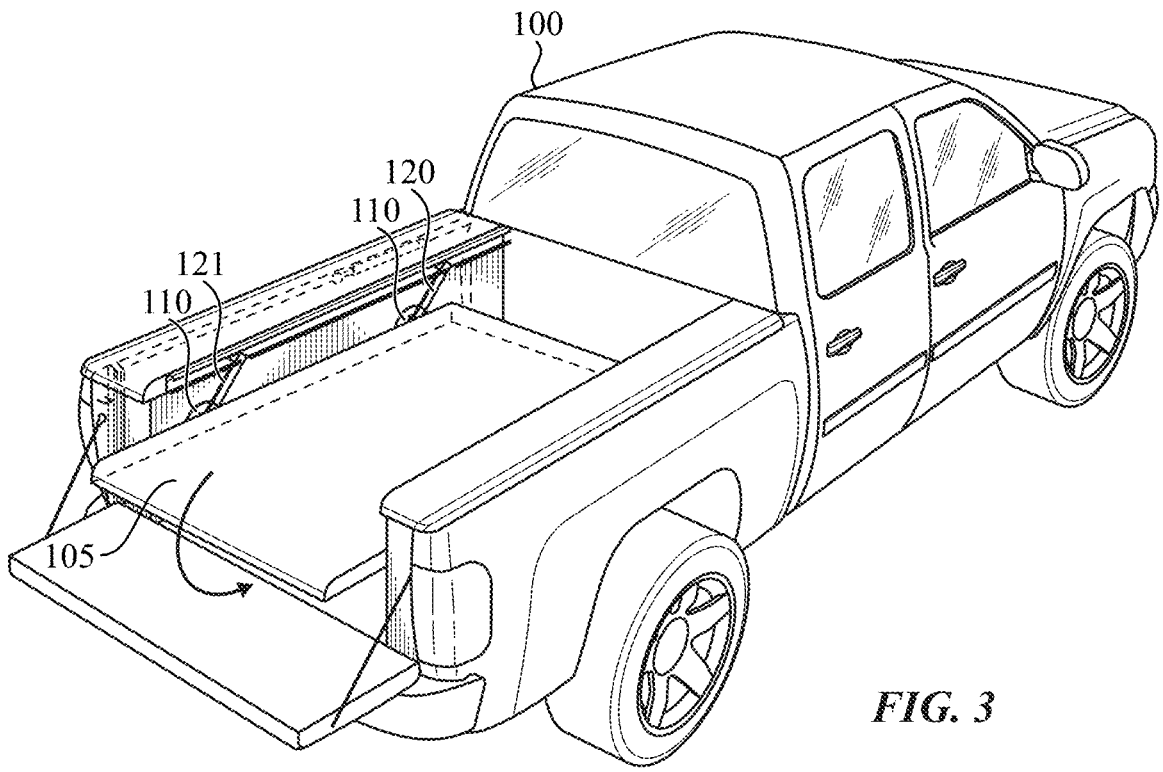
FIG. 3 shows an example truck coupled with a tonneau cover mechanism with the tonneau cover in a transition state moving toward the truck bed of the example truck, according to some embodiments.

FIG. 3 shows the example truck 100 coupled with the tonneau cover mechanism with the tonneau cover 105 in a transition state moving toward the truck bed 140 of the example truck 100, according to some embodiments. In some embodiments, the tonneau cover 105 moves towards the tailgate 130 of the example truck 100 via the tracks 120/121 in the direction of the illustrated arrow. The transitions through the turret switch 110 may also be referred to herein as a position C1 (just before entering the turret switches 110 from above the turret switches 110), and position C2 (just after leaving the turret switches 110 toward a lower position).

Figure 4:
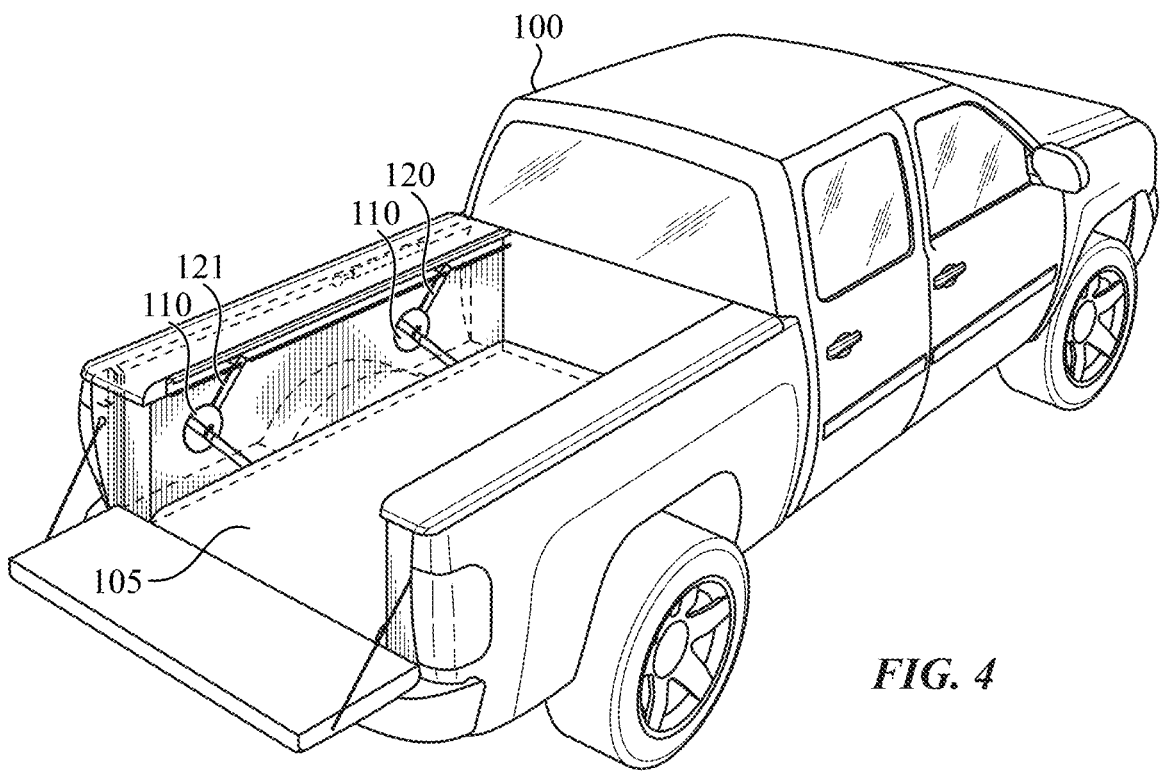
FIG. 4 shows an example truck coupled with a tonneau cover mechanism with the tonneau cover in a loading state on top of the truck bed of the example truck, according to some embodiments.

FIG. 4 shows the example truck 100 coupled with a tonneau cover mechanism with the tonneau cover 105 in a loading state (also referred to herein as position C) on top of the truck bed 140 of the example truck 100, according to some embodiments. As the wheel devices 510 (FIG. 5) pass through the turret switches 110 in the tracks 120/121, the tonneau cover 105 moves back away from the tailgate 130 into the truck bed 140. In this lowered state, the tonneau cover 105 rests near or directly against the truck bed 140. Therefore, the lowered state of the tonneau cover 105 provides for loading larger objects on top of the tonneau cover 105 or on top of a protective cover or sheet placed on the tonneau cover 105.

Figure 5:
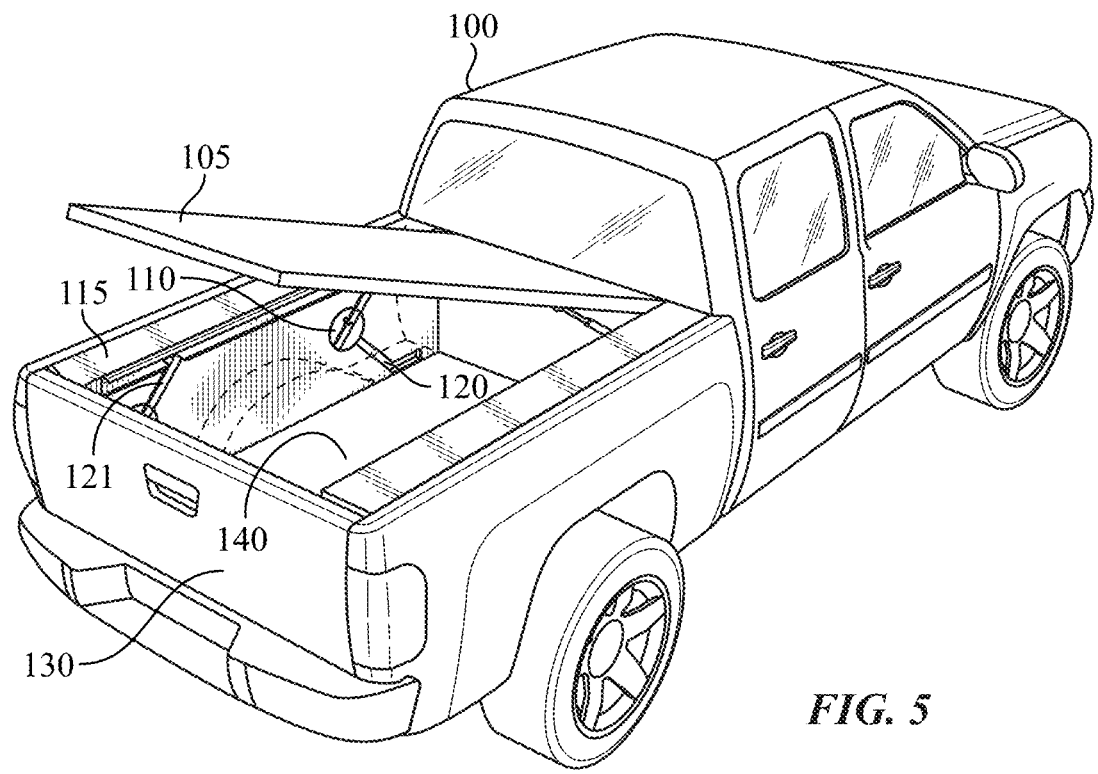
FIG. 5 shows an example truck coupled with another tonneau cover mechanism with the tonneau cover in a rotated and lifted state, according to some embodiments.

FIG. 5 shows the example truck 100 coupled with another tonneau cover mechanism with the tonneau cover 105 shown in a rotated and lifted state, according to some embodiments. In this embodiment, the tonneau cover 105 that is movable does not include the tonneau side portions that cover the side portions 115 or the storage compartments built into the truck bed 140.

Figure 6:
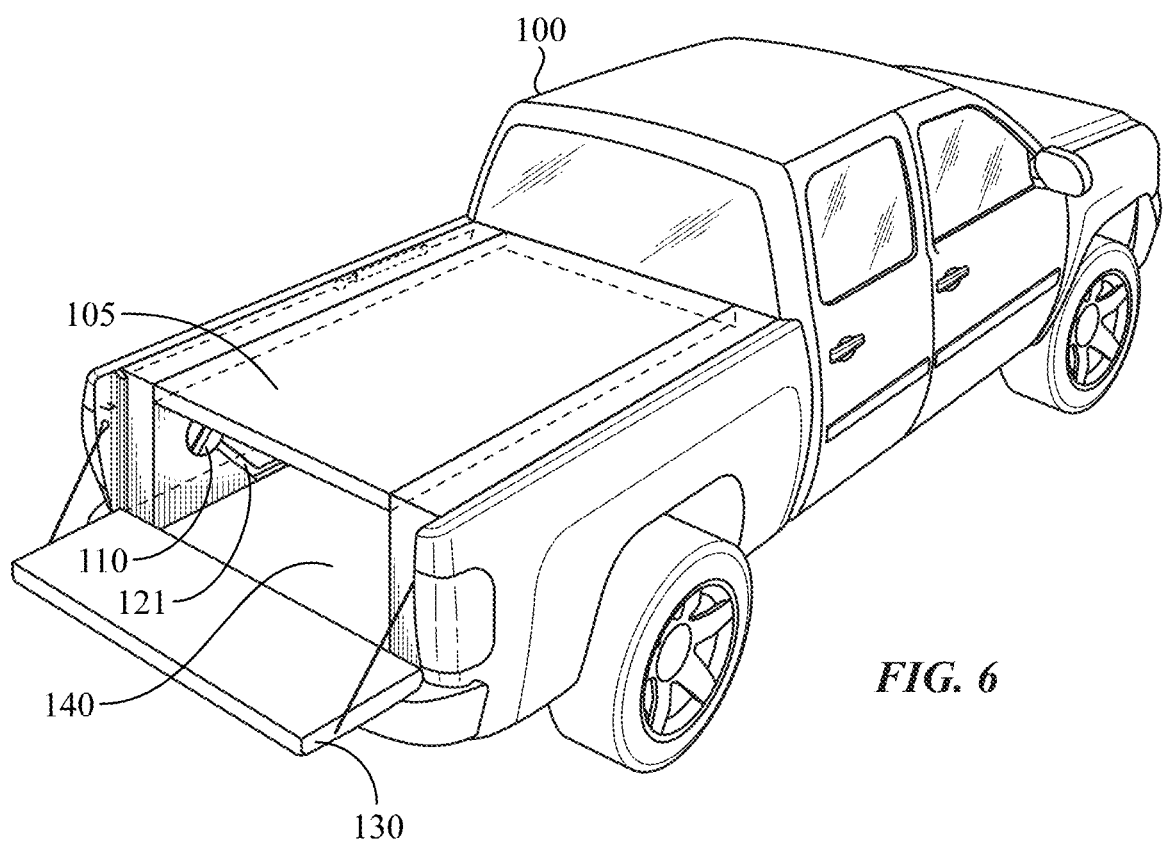
FIG. 6 shows an example truck coupled with the tonneau cover mechanism of FIG. 5 with the tonneau cover in a cover state above the truck bed of the example truck, according to some embodiments.

FIG. 6 shows the example truck 100 coupled with the tonneau cover mechanism of FIG. 5 with the tonneau cover 105 in a cover state above the truck bed 140 of the example truck 100, according to some embodiments. As illustrated, the tonneau cover 105 has a width between the side portions 115 or storage compartments.

Figure 7:
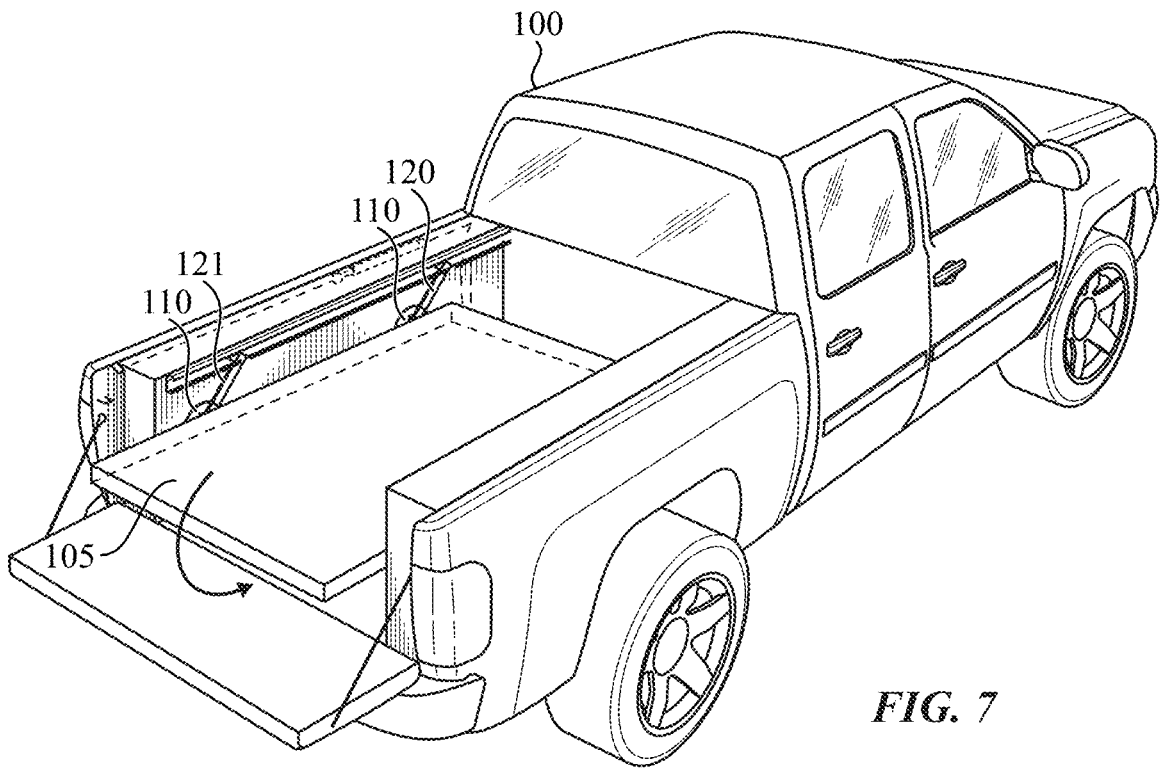
FIG. 7 shows an example truck coupled with the tonneau cover mechanism of FIG. 5 with the tonneau cover in a transition state moving toward the truck bed of the example truck, according to some embodiments.

FIG. 7 shows the example truck 100 coupled with the tonneau cover mechanism of FIG. 5 with the tonneau cover 105 in a transition state moving toward the truck bed 140 of the example truck 100, according to some embodiments. In some embodiments, the tonneau cover 105 moves towards the tailgate 130 of the example truck 100 via the tracks 120/121 in the direction of the illustrated arrow.

Figure 8:
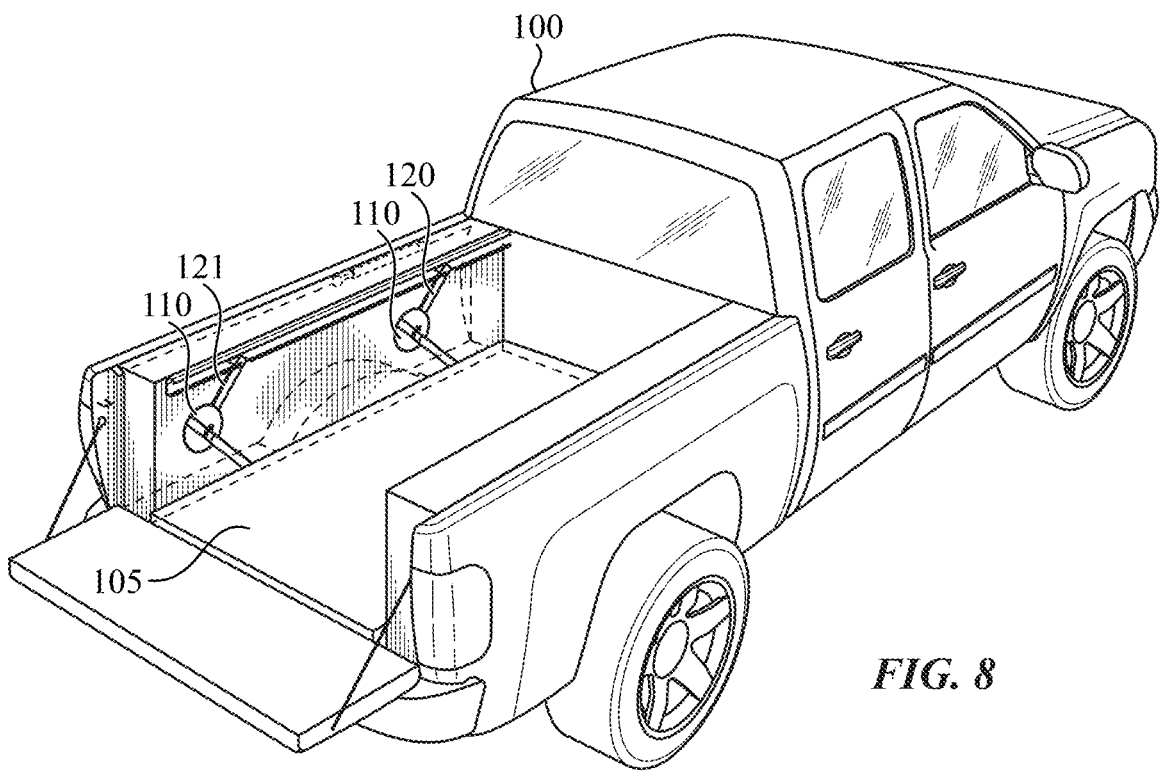
FIG. 8 shows an example truck coupled with the tonneau cover mechanism of FIG. 5 with the tonneau cover in a loading state on top of the truck bed of the example truck, according to some embodiments.

FIG. 8 shows the example truck 100 coupled with the tonneau cover mechanism of FIG. 5 with the tonneau cover 105 in a loading state on top of the truck bed 140 of the example truck 100, according to some embodiments.

Figure 9:
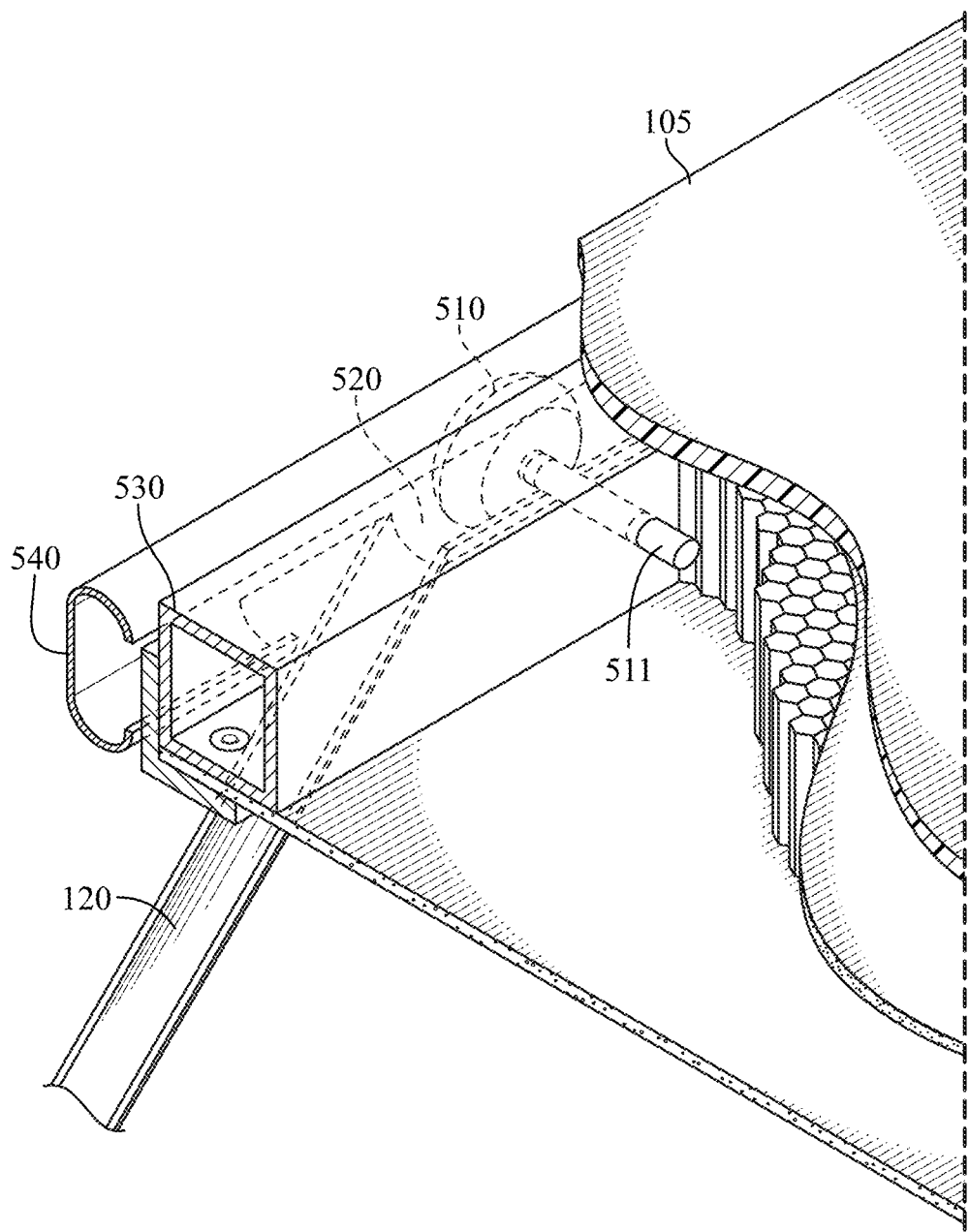
FIG. 9 shows a U-frame track (or channel) and the wheel for the tonneau cover mechanisms of FIGS. 1 and 5, according to some embodiments.

FIG. 9 shows a U-frame track (or channel) 530 and the wheel 510 for the tonneau cover mechanisms of FIGS. 1 and 5, according to some embodiments. In some embodiments, the wheel 530 includes a wheel axle 511 that rotates and may travel in and out a particular distance such that the wheel 530 travels with ease in the U-frame track 530 and tracks 120/121. In some embodiments, spacers on either side of the wheel 510 on the wheel axle 511 may be added to maintain a particular distance between the wheel 510 and the U-frame 530. The U-frame track 530 includes transition portions 520 for entering the tracks 120/121. A seal 540 may abut to the U-frame track 530 to channel water away from a truck bed (e.g., truck bed 140, FIG. 1). In one embodiment, the tracks 120 may be made of ABS and aluminum, or other materials depending on the strength desired. In some embodiments, the wheel axle 511 is embedded in the tonneau cover 105. In one embodiment, the tracks 120/121 may have a width between 0.5 to 2 inches, preferably 0.75 inches. In one embodiment, the wheels 510 may be made of rubber, nylon, metal, or any combination of materials.

Figure 10:
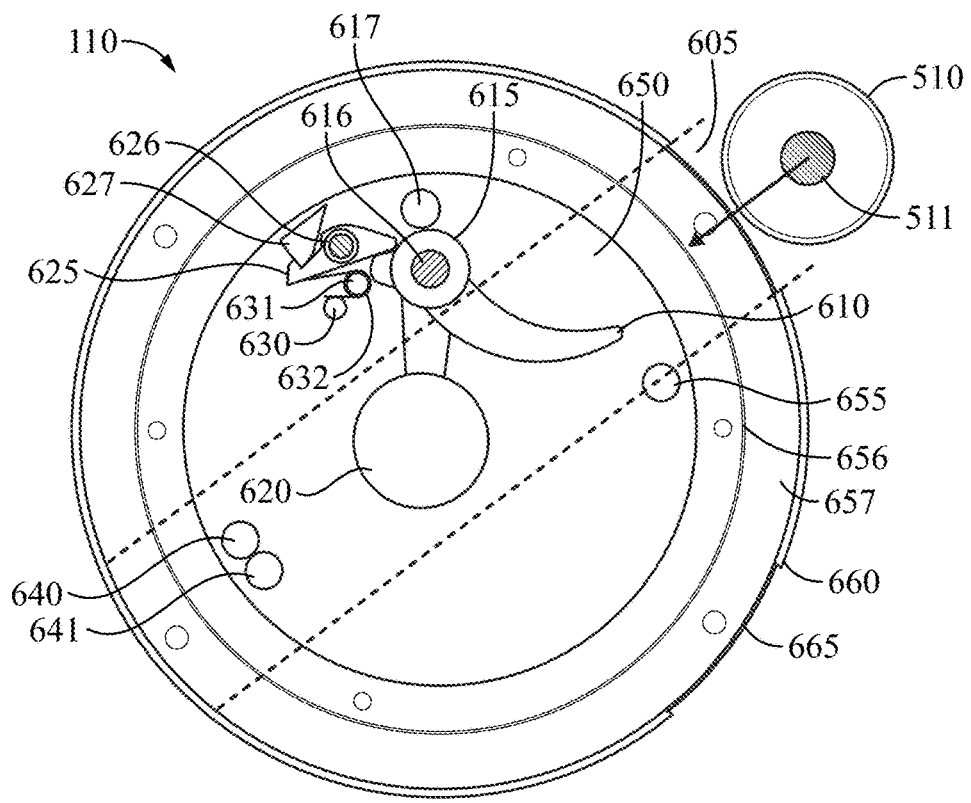
FIG. 10 shows a turret switch used for the tonneau cover mechanisms of FIGS. 1 and 5, and shown in a ready state prior to a connected wheel entering the turret switch at an upper position, according to some embodiments.

FIG. 10 shows a turret switch 110 used for the tonneau cover mechanisms of FIGS. 1 and 5, and shown in a ready state prior to a wheel 510 (e.g., coupled to a platform, such as the tonneau cover 105, FIGS. 1-9, etc.) entering the turret switch 110 at an upper position (e.g., moving the tonneau cover 105 in the tracks 120/121 from a cover position toward a truck bed 140, see e.g., FIGS. 3 and 7), according to some embodiments.

In some embodiments, the turret switches 110 may include the following components: wheel entry/exit 605, trigger 610, trigger bearing (or bearing and dowel) 615, trigger bearing connector 616, front plate block pin 1 617, trigger weight (or counterweight) 620 and cam, latch 625, latch bearing 626, latch receiver pin 627, latch pin 2 630, latch pin 1 631, latch spring 632, front plate block pin 2 640, back plate block pin 1 641, front plate wheel track 650, back plate block pin 2 655, bearings 656, outer bearing track 657, turret wall 660, and wheel entry/exit 665. The turret switch 110 includes a front plate and a back plate. In one embodiment, the trigger bearing 615 and the latch bearing 626 are bearings installed in the front plate of the turret switches 110. In one embodiment, the trigger 610 is on top of the front plate. In one embodiment, the back plate block pin 1 641, back late block pin 2 655 and the latch receiver pin 627 are attached in front of the back plate. In one embodiment, the trigger weight 620 and cam, the front plate block pin 1 617, front plate block pin 2 640, the latch 625, latch pin 1 631, and latch pin 2 630 are attached behind the front plate.

In one embodiment, the turret switch 110 is shown while the tonneau cover 105 (see, e.g., FIG. 1-9) is in a cover position (position C1) and transitioning towards a lower position (e.g., toward position C2). The wheel 510 is attached to the tonneau cover 105 (see, e.g., FIGS. 1-9) with the associated weight of the tonneau cover 105. When the wheel 510 enters (in the direction of the arrow) the turret switch 110 from a track 120/121 (see, e.g., FIGS. 1-9) and pushes upon the trigger 610, the trigger 610 operates a cam that presses on the latch 625 to release the latch 625 that is connected with the latch receiver pin 627.

In one embodiment, the turret switches 110 include an outer wall having a circumference sized depending on the use case (e.g., for cabinet shelving, the circumference is smaller than for a tonneau cover or vehicle shelving, etc.). In one embodiment, the front plate rotates on a set of bearings, rollers, small diameter wheels with bearings, etc. that are each connected with the outer circumference of the outer wall of the turret switches 110. The front plate rotates with the wheel track 650 on the front surface.

Figure 11:
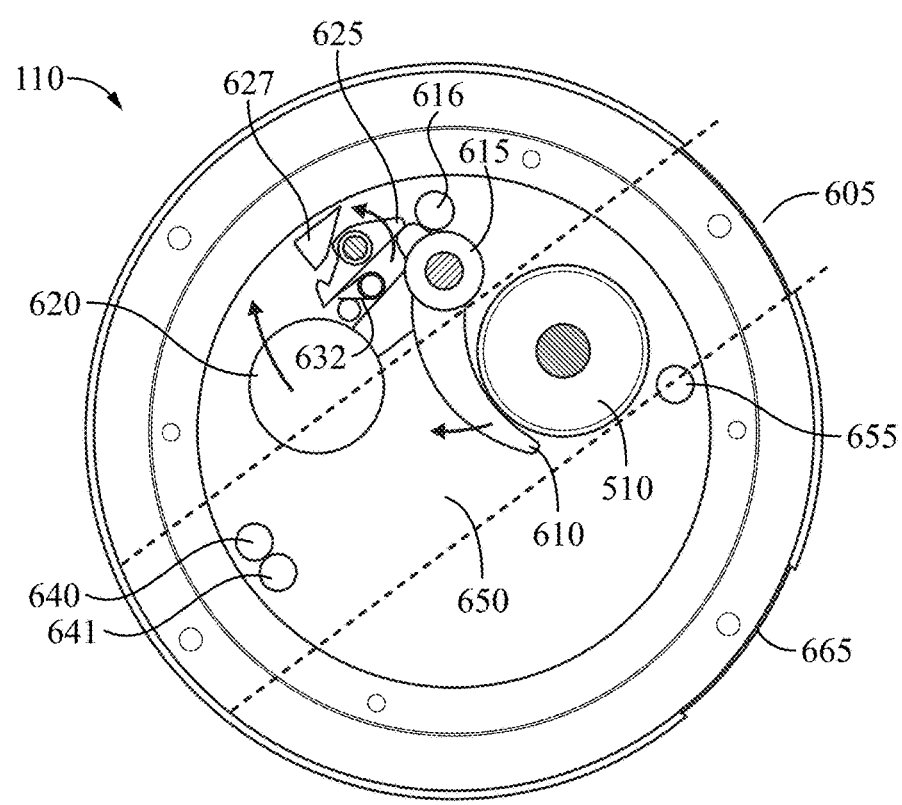
FIG. 11 shows the turret switch used for the tonneau cover mechanisms of FIGS. 1 and 5, and shown at the start of a transition state for moving the connected wheel through the turret switch from an upper position to a lower position, according to some embodiments.

FIG. 11 shows the turret switch 110 used for the tonneau cover mechanisms of FIGS. 1 and 5, and shown at the start of a transition state for moving the connected wheel 510 through the turret switch 110 from an upper position C1 to a lower position C2, according to some embodiments. As shown, the wheel 510 has pushed the trigger 610 (in the direction of the arrow) causing the cam to release the latch 625 connected with the latch receiver pin 627 (moving the trigger weight 620 in the direction of the arrow). The weight upon the wheel 510 rotates the turret switch 110 and the front plate wheel track 650 toward a transition to connect with the lower portion of a track 120/121 (see, e.g., FIGS. 1-9).

Figure 12:
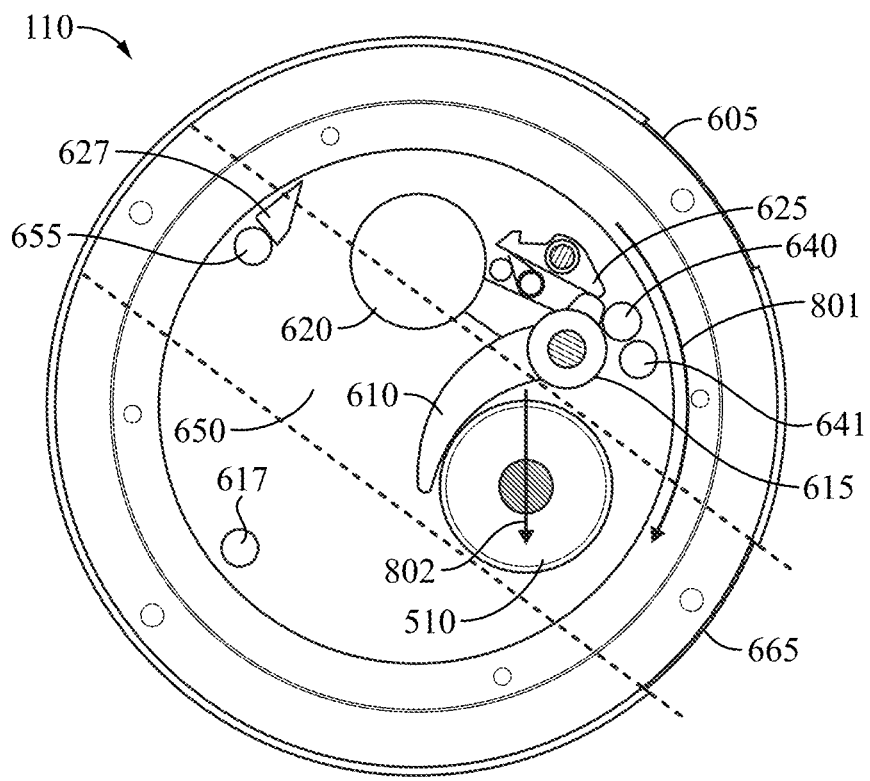
FIG. 12 shows the turret switch used for the tonneau cover mechanisms of FIGS. 1 and 5, and shown transitioning the connected wheel toward a lower exit of the turret switch, according to some embodiments.

FIG. 12 shows the turret switch 110 used for the tonneau cover mechanisms of FIGS. 1 and 5, and shown transitioning the connected wheel 510 toward a lower wheel entry/exit 665 of the turret switch 110, according to some embodiments. The turret switch 110 is showing where the tonneau cover 105 (see, e.g., FIGS. 1-9) is transitioning towards position C. The weight upon the wheel 510 (in the direction of the arrow 802) has rotated the turret switch 110 (in the direction of the arrow 801) and the front plate wheel track 650 to connect with the lower portion of a track 120/121 (see, e.g., FIGS. 1-9).

Figure 13:
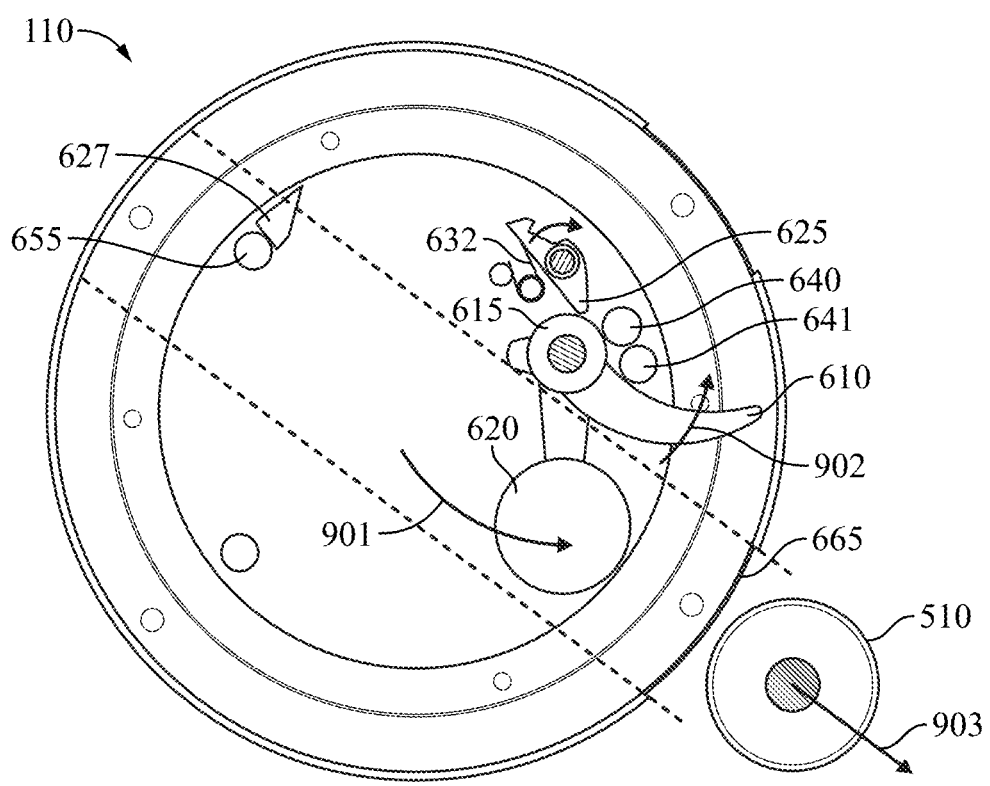
FIG. 13 shows the turret switch used for the tonneau cover mechanisms of FIGS. 1 and 5, and showing a connected wheel exited the turret switch, according to some embodiments.

FIG. 13 shows the turret switch 110 used for the tonneau cover mechanisms of FIGS. 1 and 5, and showing a connected wheel 510 exited the turret switch 110, according to some embodiments. The tonneau cover 105 (see, e.g., FIGS. 1-9) is transitioning towards position C from the C2 position. The wheel 510 has left the turret switch 110 in the direction of the arrow 903. The trigger weight 620 is shown moving in the direction of arrow 901 and the trigger 610 is shown moving in the direction of arrow 902. As the cam moves past the latch 625, the latch spring 632 exerts a force on the latch 625 moving the latch 625 in the direction of the arrow shown on the latch 625.

Figure 14:
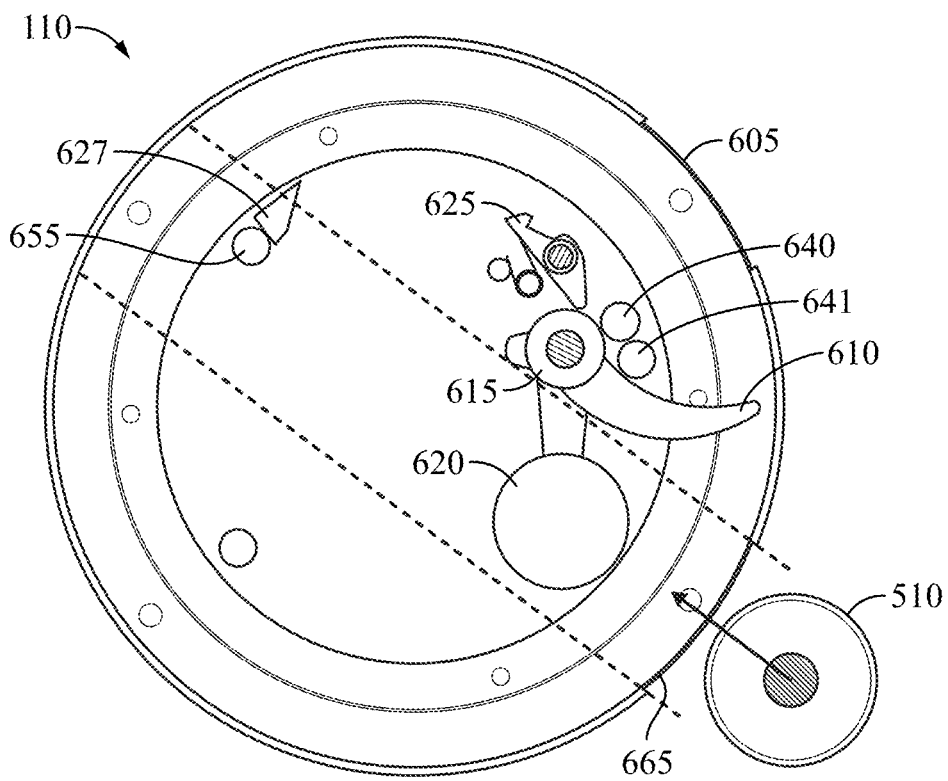
FIG. 14 shows the turret switch used for the tonneau cover mechanisms of FIGS. 1 and 5, and shown in a ready state for the connected wheel at a lower position, according to some embodiments.

FIG. 14 shows the turret switch 110 used for the tonneau cover mechanisms of FIGS. 1 and 5, and shown in a ready state (position C2) for the connected wheel 510 at a lower position, according to some embodiments. This view shows the turret switch 110 while the tonneau cover 105 (see, e.g., FIGS. 1-9) is transitioning towards position B. The wheel 510 is about to enter the turret switch 110 in the direction of the arrow to enter wheel entry/exit 665.

Figure 15:
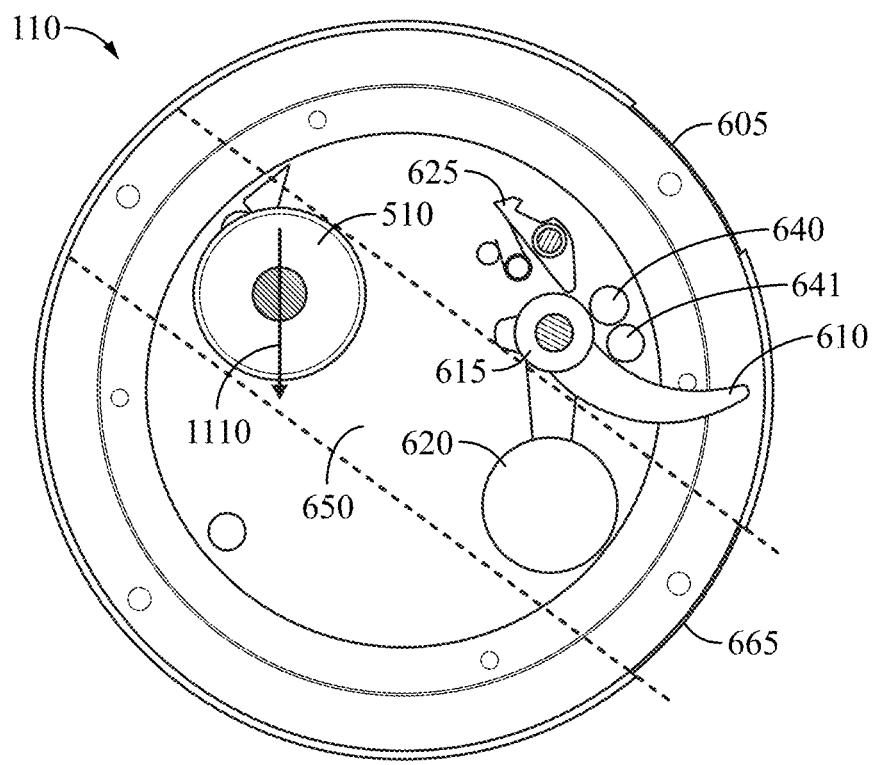
FIG. 15 shows the turret switch used for the tonneau cover mechanisms of FIGS. 1 and 5, and shown rotating the turret switch for transitioning the connected wheel from a lower position to an upper position, according to some embodiments.

FIG. 15 shows the turret switch 110 used for the tonneau cover mechanisms of FIGS. 1 and 5, and shown rotating the turret switch 110 for transitioning the connected wheel 510 from a lower position to an upper position, according to some embodiments. For this view, the tonneau cover 105 (see, e.g., FIGS. 1-9) is transitioning towards position B. The wheel 510 has entered the turret switch 110 through the wheel entry/exit 665. The weight upon the wheel 510 (in the direction of the arrow 1110) rotates the turret switch 110 and front plate wheel track 650 to connect with the upper portion of the track 120/121 (see, e.g., FIGS. 1-9).

Figure 16:
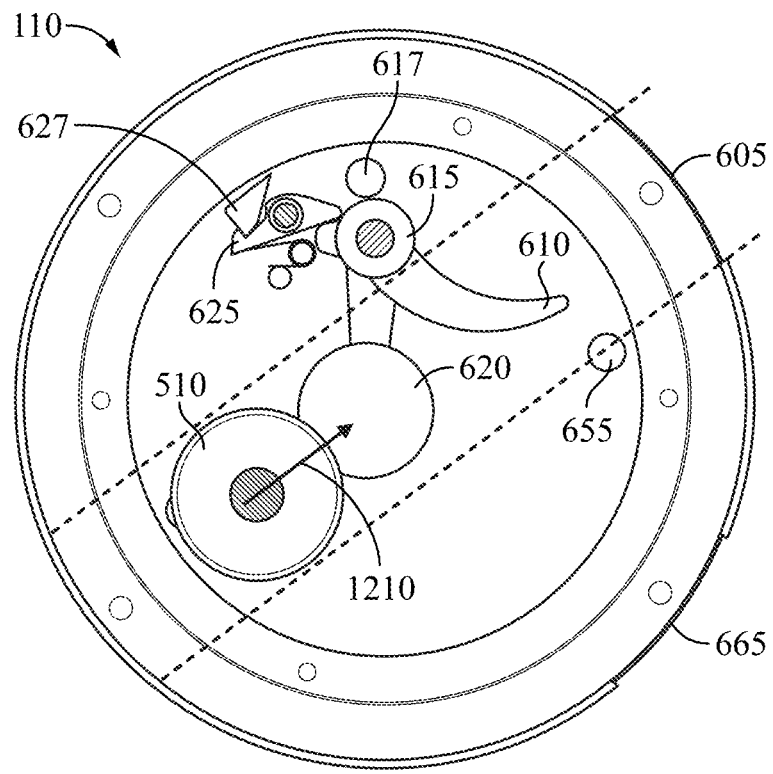
FIG. 16 shows the turret switch used for the tonneau cover mechanisms of FIGS. 1 and 5, and showing the connected wheel moving toward an upper exit of the turret switch, according to some embodiments.

FIG. 16 shows the turret switch 110 used for the tonneau cover mechanisms of FIGS. 1 and 5, and showing the connected wheel 510 moving toward an upper exit of the turret switch 110 towards position B, according to some embodiments. As illustrated, the weight upon the wheel 510 has rotated the turret switch 110 and front plate wheel track 650 up to connect with the upper portion of track 120/121. The latch 625 is now connected with the latch receiver pin 627 which keeps the turret switch 110 from rotating as the wheel 510 moves up the front plate wheel track 650 in the direction of arrow 1210.

Figure 17:
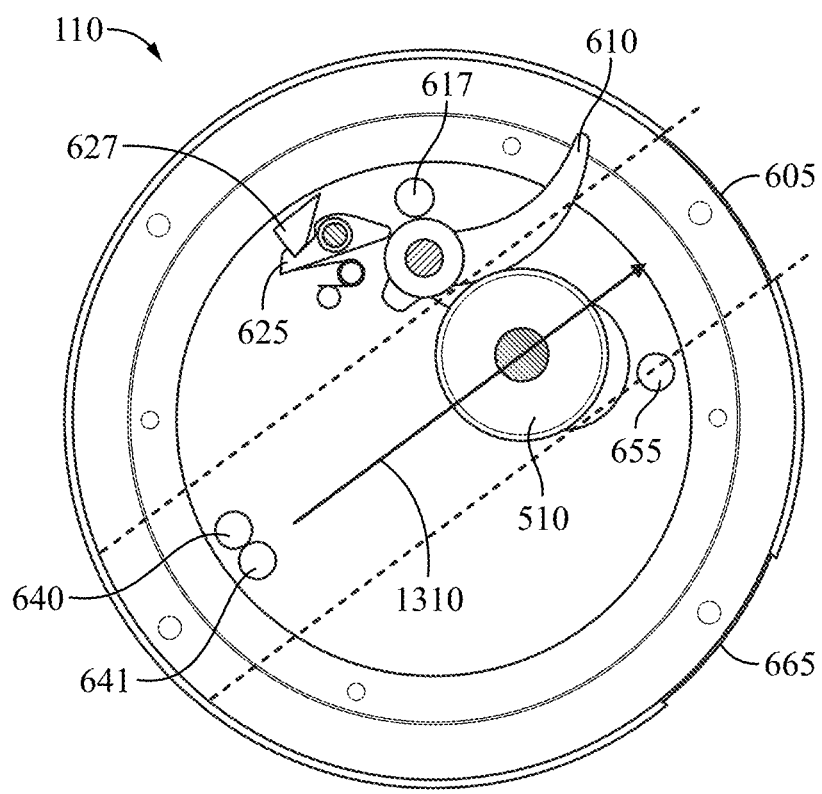
FIG. 17 shows the turret switch used for the tonneau cover mechanisms of FIGS. 1 and 5, and showing the connected wheel continuing to move toward the upper exit of the turret switch, according to some embodiments.

FIG. 17 shows the turret switch 110 used for the tonneau cover mechanisms of FIGS. 1 and 5, and showing the connected wheel 510 continuing to move toward the wheel entry/exit 605 (in the direction of arrow 1310) of the turret switch 110, according to some embodiments. This view shows the turret switch 110 while the tonneau cover 105 (see, e.g., FIGS. 1-9) is transitioning towards position B. The wheel 510 is pushing the trigger 610 out of the way as it moves towards the wheel entry/exit 605.

Figure 18:
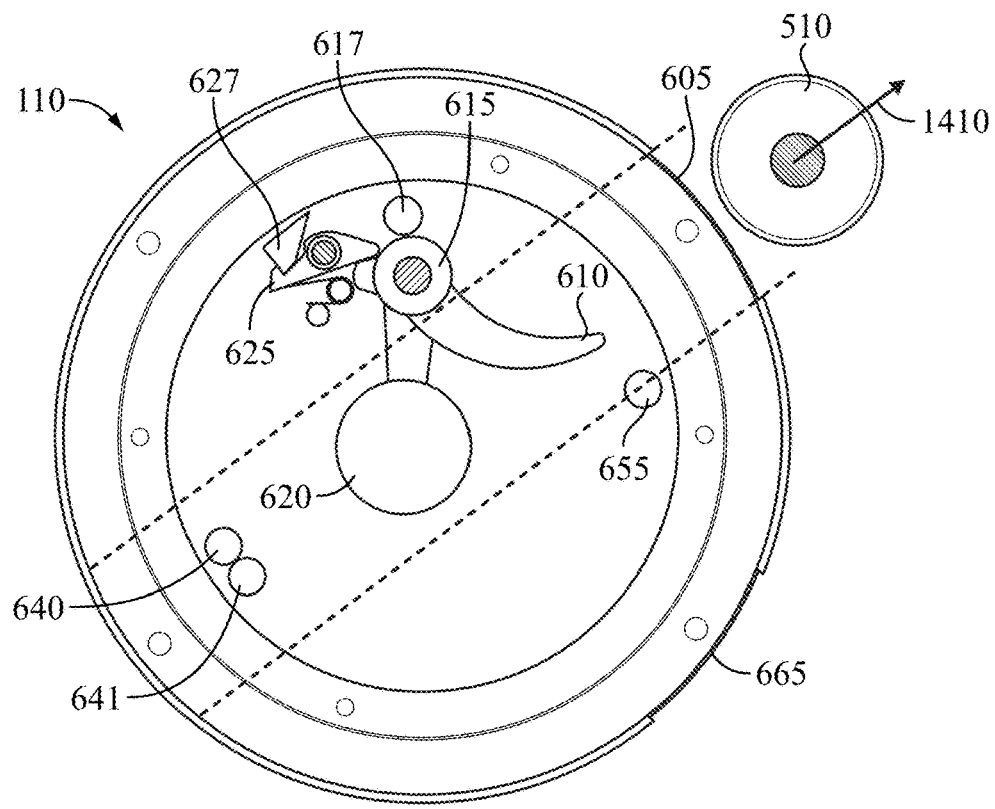
FIG. 18 shows the turret switch used for the tonneau cover mechanisms of FIGS. 1 and 5, and showing the connected wheel exited the turret switch, according to some embodiments.

FIG. 18 shows the turret switch 110 used for the tonneau cover mechanisms of FIGS. 1 and 5, and showing the connected wheel 510 exited the turret switch 110 in the direction of the arrow 1410, according to some embodiments. This view shows the turret switch 110 while the tonneau cover 105 (see, e.g., FIGS. 1-9) is transitioning towards position B. The wheel 510 has now exited the turret switch 110 from the wheel entry/exit 605. The turret switch 110 remains in the shown state for the next moving transition of the tonneau cover 105.

Figure 19:
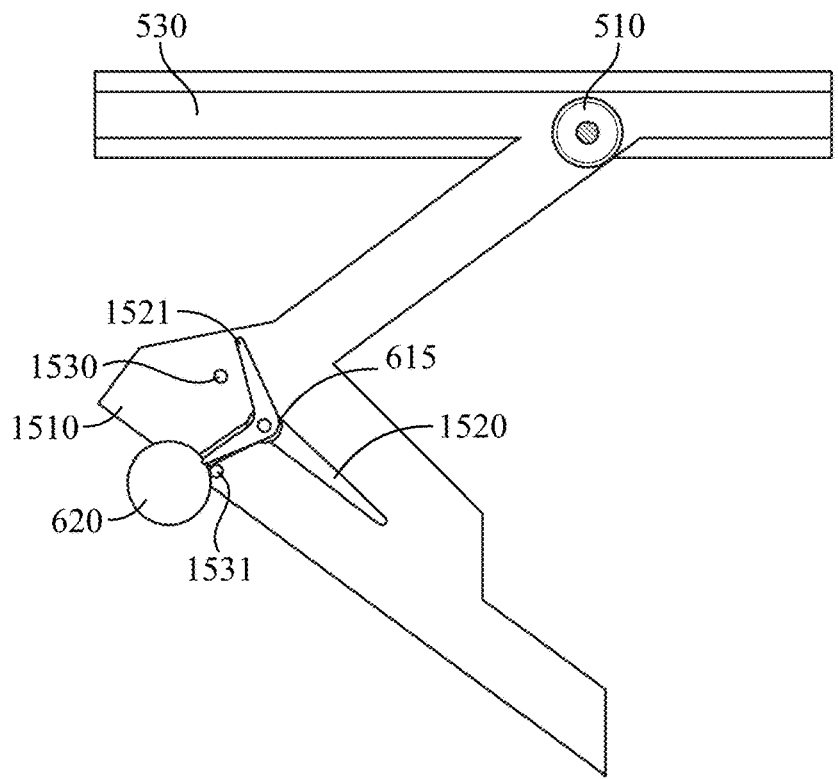
FIG. 19 shows an alternative switch mechanism used for the tonneau cover mechanisms of FIGS. 1 and 5, and shown in a ready state prior to a connected wheel entering the alternative switch mechanism at an upper position, according to some embodiments.

FIG. 19 shows an alternative trigger switch mechanism used for the tonneau cover mechanisms of FIGS. 1 and 5, and shown in a ready state prior to a connected wheel 510 entering the alternative trigger switch mechanism (at the default position) at an upper position, according to some embodiments. In one embodiment, the alternative switch trigger mechanism includes an alternate track 1510 (alternate to tracks 120/121, FIG. 1), arms 1520 (or track divider and stop; for switch lever 1521) and 1521 (or switch lever), bearing and dowel 615, trigger weight (or counterweight) 620 and stop pins 1530 and 1531. In some embodiments, the bearing and dowel 615 and the trigger weight 620 are positioned behind the track 1510.

In some embodiments, when the wheel 510 contacts the arm 1520 moving from position B toward position C, the wheel 510 moves down into the lower section of the track 1510 and contacts switch lever 1521, which is stationary and does not move from the default position. The switch lever 1521 diverts the wheel 510 to move onto the track divider 1520. The wheel 510 moves down the track divider 1520 onto the track 1510 towards and onto the lower position (position C).

In the opposite direction as the tonneau cover 105 moves from position C to position B, the wheel 510 enters the bottom portion of track 1510 and moves onto switch lever 1521 out of the path. The trigger weight 620 pulls down on the switch lever 1521 back to a default position. The switch lever 1521 blocks the wheel 510 from moving backwards down the track 1510. The wheel 510 moves down the track 1510 onto the switch lever 1521. The wheel 510 rests on the switch lever 1521 until a force is applied to move the wheel 510 off the switch lever 1521. When the force is applied (e.g., from a user, from a motor, etc.) to the wheel 510, the wheel 510 pushes through the switch lever 1521, which causes the switch lever 1521 to bridge the opening in the upper portion of track 1510 to position B. The trigger weight 620 then pulls down on the switch lever 1521 and moves it back to the default position.

In some embodiments, the stop pins 1530 and 1531 may be adjusted to positions depending on the size of the track 1510, wheel 510 size, and size and length of the track divider 1520 and the switch lever 1521, etc.

Figure 20:
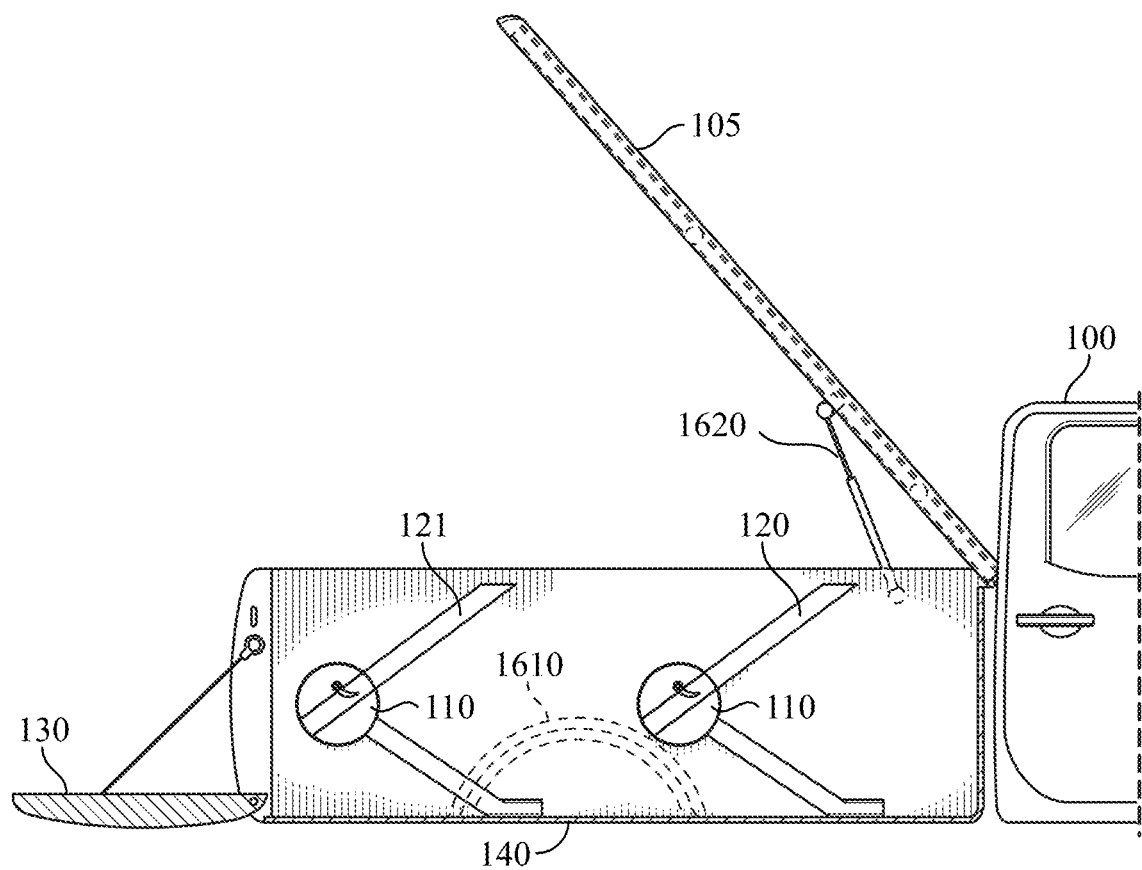
FIG. 20 shows a side internal view of an example truck coupled with a tonneau cover mechanism showing the tonneau cover in a rotated and lifted state, according to some embodiments.

FIG. 20 shows a side internal view of an example truck 100 coupled with a tonneau cover mechanism showing the tonneau cover 105 in a rotated and lifted state (position A), according to some embodiments. As shown, the tracks 120/121 are positioned outside of the wheel wells 1610. In one embodiment, the lift supports (e.g., shocks, structs, etc.) 1620 assist with raising/lowering the tonneau cover 105. In some embodiments, the lift supports 1620 and lift hinges are removably connected to the tonneau cover and/or the side walls of the truck bed 140.

Figure 21:
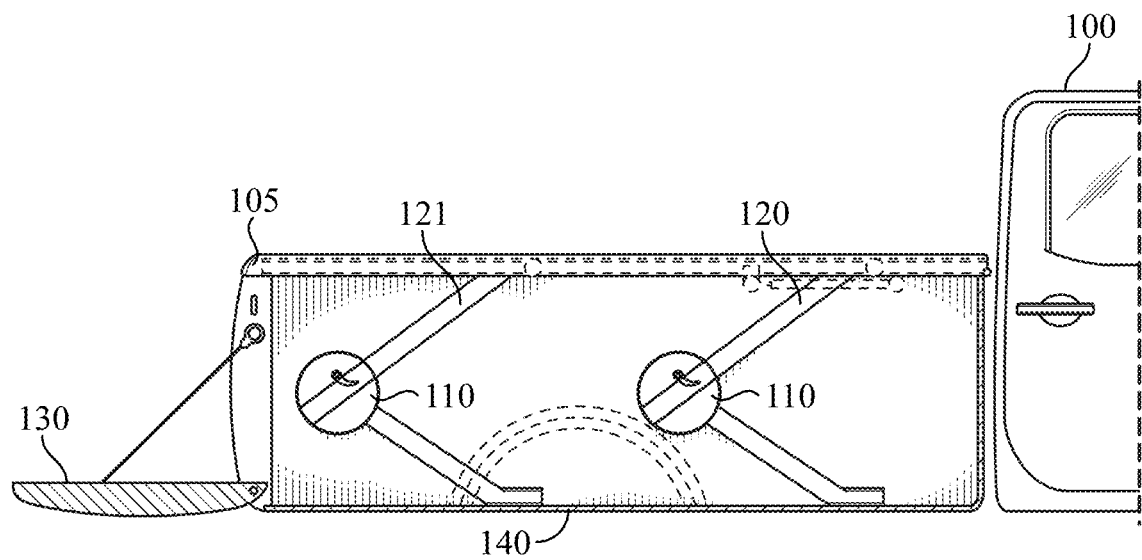
FIG. 21 shows a side internal view of an example truck coupled with a tonneau cover mechanism with the tonneau cover in a cover state above the truck bed of the example truck, according to some embodiments.

FIG. 21 shows a side internal view of an example truck 100 coupled with a tonneau cover mechanism with the tonneau cover 105 in a cover state (position B) above the truck bed 140 (on top of the side walls of the truck bed 140, side portions 115 (FIG. 1), etc.) of the example truck 100, according to some embodiments. Contents placed in the truck bed 140 are protected under the tonneau cover 105 in position B. To lower the tonneau cover 105 from position B to the bottom of the truck bed 140, the contents must be removed from the truck bed 140.

Figure 22:
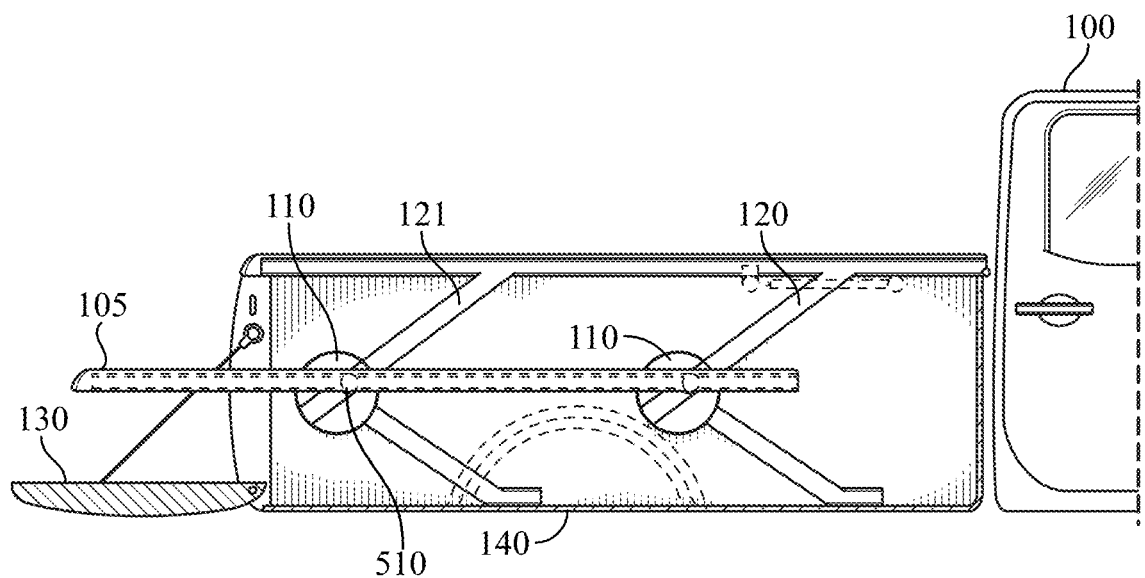
FIG. 22 shows a side internal view of an example truck coupled with a tonneau cover mechanism with the tonneau cover in a transition state moving toward the truck bed of the example truck, and prior to a connected wheel moving into a turret switch, according to some embodiments.

FIG. 22 shows a side internal view of an example truck 100 coupled with a tonneau cover mechanism with the tonneau cover 105 in a transition state (position C1) moving toward the truck bed 140 of the example truck 100, and prior to a connected wheel 510 moving into a turret switch 110, according to some embodiments. The tonneau cover 105 is shown with the wheels 510 entering the turret switch 110 and turret track. At this point the wheels 510 release the turret switches 110, which in turn allows the tonneau cover 105 to rotate the turret switch 110 and turret track and connect with the lower portions of the tracks 120/121. In some embodiments, the tailgate 130 must be opened or pulled down so there is room for the tonneau cover 105 to move backwards (then forwards) as it moves toward position C.

Figure 23:
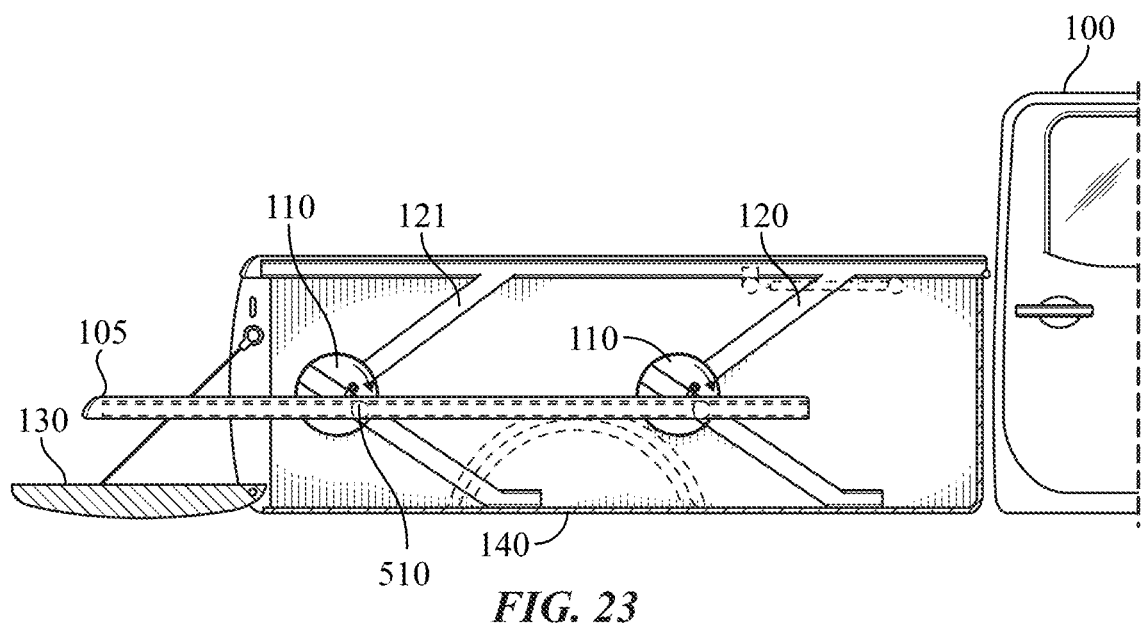
FIG. 23 shows a side internal view of an example truck coupled with a tonneau cover mechanism with the tonneau cover in a transition state moving toward the truck bed of the example truck, and after the connected wheel moved through the turret switch, according to some embodiments.

FIG. 23 shows a side internal view of an example truck 100 coupled with a tonneau cover mechanism with the tonneau cover 105 in a transition state (position C2) moving toward the truck bed 140 of the example truck 100, and after the connected wheel 510 moved through the turret switch 110, according to some embodiments. As shown, the tonneau cover 105 is moving towards position C. The tonneau cover 105 is shown with the wheels 510 in the turret switch 110 after releasing the turret switches 110 and has rotated the turret switches 110 and turret rack to connect with the lower portion of the tracks 120/121. In one embodiment, the tonneau cover 105 includes finger grip portions on the underside to make gripping/pulling the tonneau cover 105 easier. In one embodiment, the tonneau cover 105 may include one or more pop-out handles (not shown) to ease moving the tonneau cover 105 up and down in the tracks 120/121.

Figure 24:
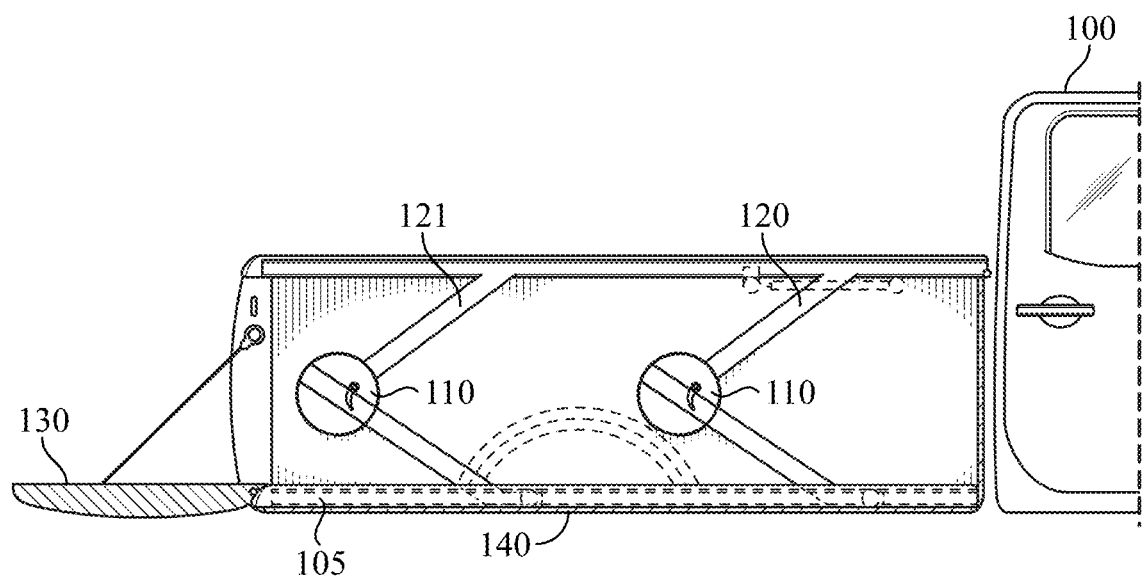
FIG. 24 shows a side internal view of an example truck coupled with a tonneau cover mechanism with the tonneau cover in a loading state on top of the truck bed of the example truck, according to some embodiments.

FIG. 24 shows a side internal view of an example truck 100 coupled with a tonneau cover mechanism with the tonneau cover 105 in a loading state (position C) on top of the truck bed 140 of the example truck 100, according to some embodiments. In position C, objects may be placed in the truck bed 140 on top of the tonneau cover 105 (or a protective cover, sheet, etc.). In one embodiment, the tonneau cover 105 has a thickness such that the tonneau cover 105 is level with the tailgate 130 for ease of sliding heavier objects onto the tonneau cover 105. In other embodiments, if the tonneau cover 105 has a thickness such that the tonneau cover 105 is higher than the tailgate 130 in position C, a loading element (not shown) may be placed on the tailgate 130 to ease sliding objects onto the tonneau cover 105.

Figure 25:
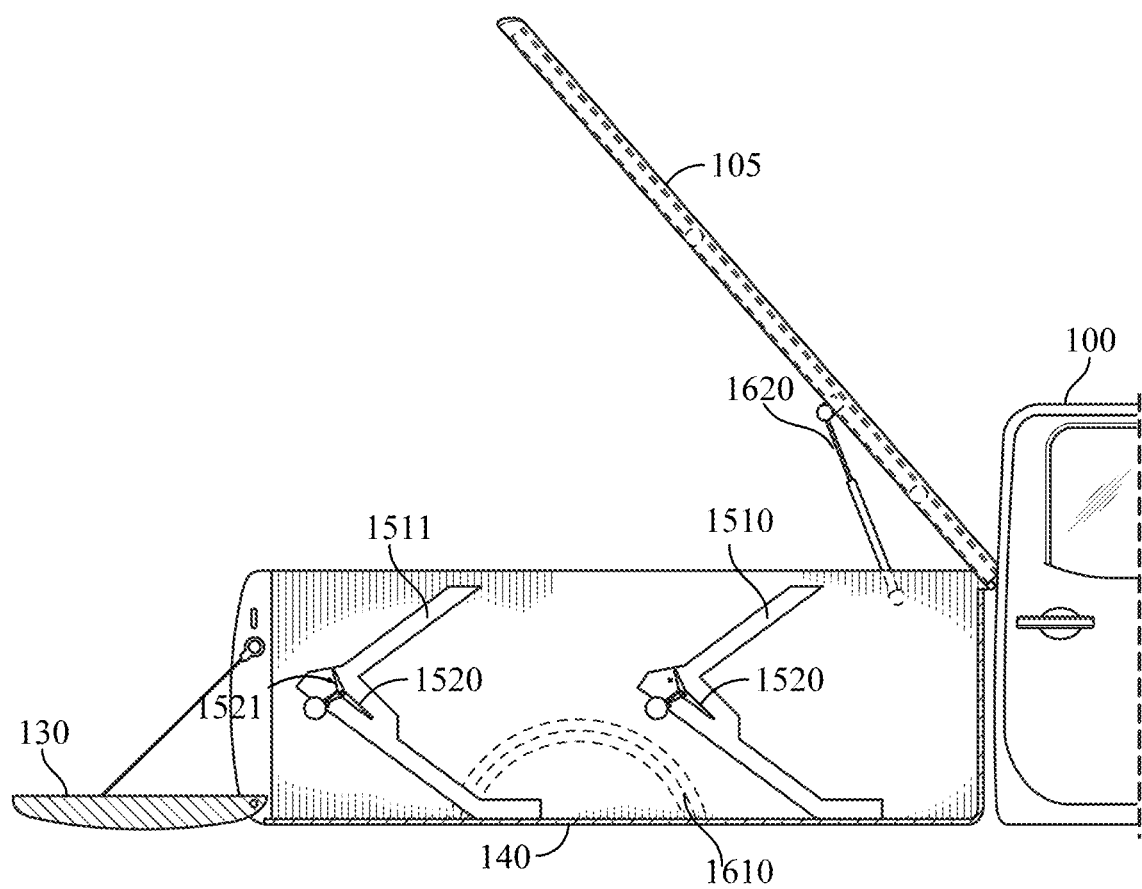
FIG. 25 shows a side internal view of an example truck coupled with a tonneau cover mechanism including the alternative switch of FIG. 19, showing the tonneau cover in a rotated and lifted state, according to some embodiments.

FIG. 25 shows a side internal view of an example truck 100 coupled with a tonneau cover mechanism including the alternative switch 1510 of FIG. 19, showing the tonneau cover 105 in a rotated and lifted state (position A), according to some embodiments. As shown, the tracks 1510/1511 are positioned outside of the wheel wells 1610. In one embodiment, the lift supports (e.g., shocks, structs, etc.) 1620 assist with raising/lowering the tonneau cover 105. In some embodiments, the lift supports 1620 and lift hinges are removably connected to the tonneau cover and/or the side walls of the truck bed 140.

Figure 26:
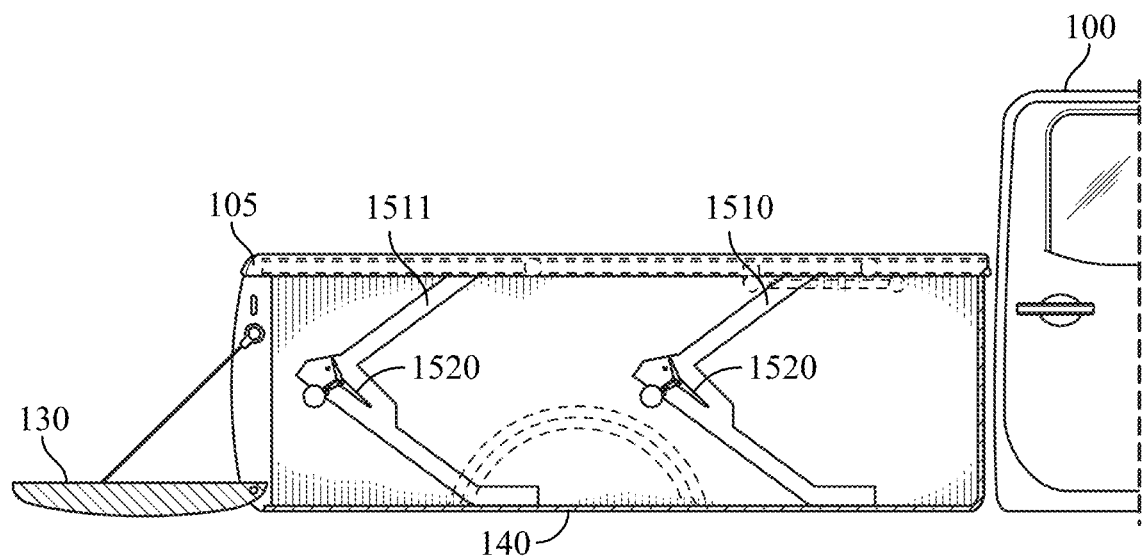
FIG. 26 shows a side internal view of an example truck coupled with a tonneau cover mechanism including the alternative switch of FIG. 19, with the tonneau cover in a cover state above the truck bed of the example truck, according to some embodiments.

FIG. 26 shows a side internal view of an example truck 100 coupled with a tonneau cover mechanism including the alternative switch of FIG. 19, with the tonneau cover 105 in a cover state (position B) above the truck bed 140 (on top of the side walls of the truck bed 140, side portions 115 (FIG. 1), etc.) of the example truck 100, according to some embodiments. Contents placed in the truck bed 140 are protected under the tonneau cover 105 in position B. To lower the tonneau cover 105 from position B to the bottom of the truck bed 140, the contents must be removed from the truck bed 140.

Figure 27:
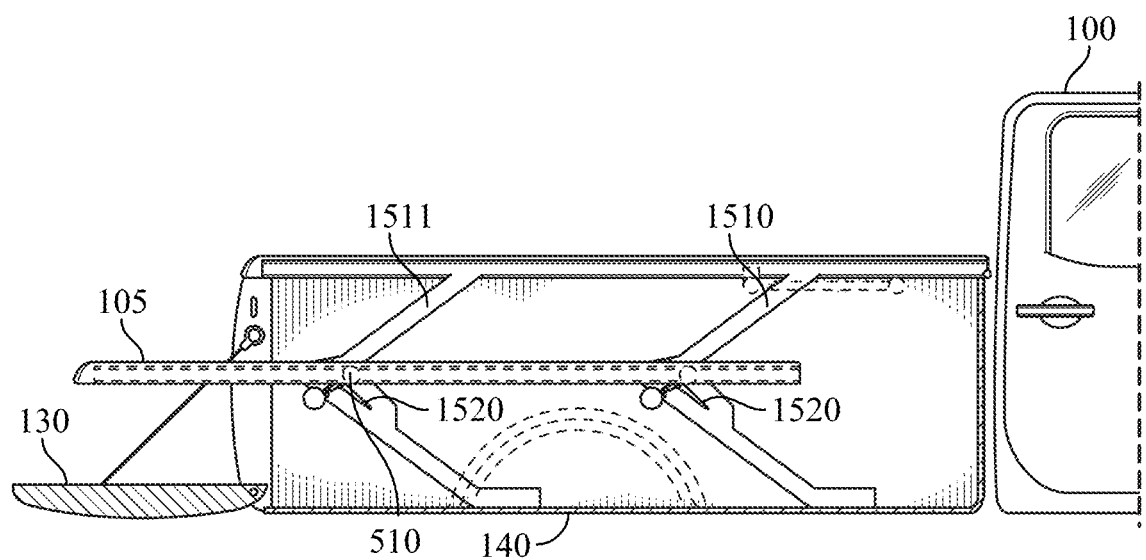
FIG. 27 shows a side internal view of an example truck coupled with a tonneau cover mechanism including the alternative switch of FIG. 19, with the tonneau cover in a transition state moving toward the truck bed of the example truck, and prior to a connected wheel moving through the alternative switch, according to some embodiments.

FIG. 27 shows a side internal view of an example truck 100 coupled with a tonneau cover mechanism including the alternative switch of FIG. 19, with the tonneau cover 105 in a transition state moving toward the truck bed 140 of the example truck 100, and prior to connected wheels 510 moving through the alternative switches, according to some embodiments. The tonneau cover 105 is shown with the wheels 510 entering the alternative switches and tracks 1510/1511. At this point the wheels 510 release the alternative switches, which in turn allows the tonneau cover 105 to connect with the lower portions of the tracks 1510/1511. In some embodiments, the tailgate 130 must be opened or pulled down so there is room for the tonneau cover 105 to move backwards (then forwards) as it moves toward position C.

Figure 28:
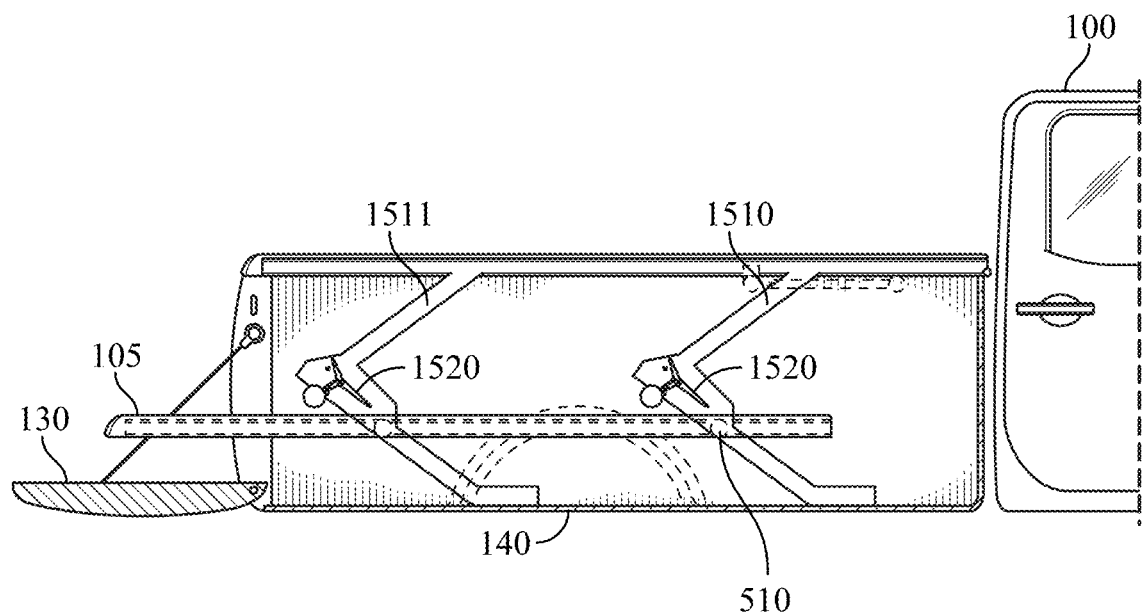
FIG. 28 shows a side internal view of an example truck coupled with a tonneau cover mechanism including the alternative switch of FIG. 19, with the tonneau cover in a transition state moving toward the truck bed of the example truck, and after the connected wheel moved through the alternative switch, according to some embodiments.

FIG. 28 shows a side internal view of an example truck 100 coupled with a tonneau cover mechanism including the alternative switch of FIG. 19, with the tonneau cover 105 in a transition state moving toward the truck bed 140 of the example truck 100, and after the connected wheel 510 moved through the alternative switch, according to some embodiments. As shown, the tonneau cover 105 is moving towards position C. The tonneau cover 105 is shown with the wheels 510 released to connect with the lower portion of the tracks 1510/1511. In one embodiment, the tonneau cover 105 includes finger grip portions on the underside to make gripping/pulling the tonneau cover 105 easier. In one embodiment, the tonneau cover 105 may include one or more pop-out handles (not shown) to ease moving the tonneau cover 105 up and down in the tracks 120/121.

Figure 29:
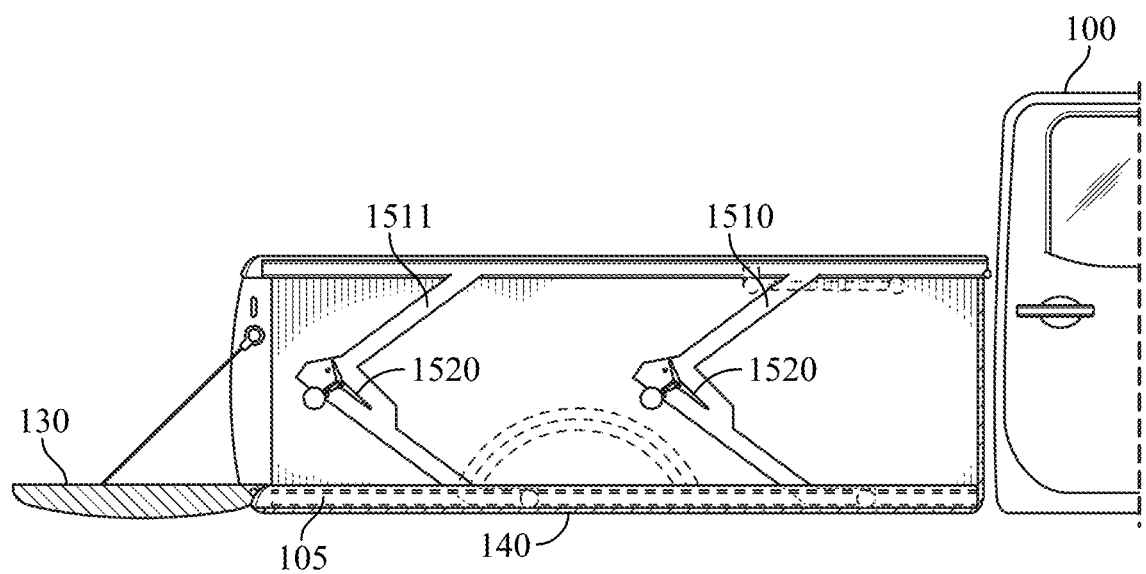
FIG. 29 shows a side internal view of an example truck coupled with a tonneau cover mechanism including the alternative switch of FIG. 19, with the tonneau cover in a loading state on top of the truck bed of the example truck, according to some embodiments.

FIG. 29 shows a side internal view of an example truck 100 coupled with a tonneau cover mechanism including the alternative switch of FIG. 19, with the tonneau cover 105 in a loading state (position C) on top of the truck bed 140 of the example truck 100, according to some embodiments. In position C, objects may be placed in the truck bed 140 on top of the tonneau cover 105 (or a protective cover, sheet, etc.). In one embodiment, the tonneau cover 105 has a thickness such that the tonneau cover 105 is level with the tailgate 130 for ease of sliding heavier objects onto the tonneau cover 105. In other embodiments, if the tonneau cover 105 has a thickness such that the tonneau cover 105 is higher than the tailgate 130 in position C, a loading element (not shown) may be placed on the tailgate 130 to ease sliding objects onto the tonneau cover 105.

Figure 30:
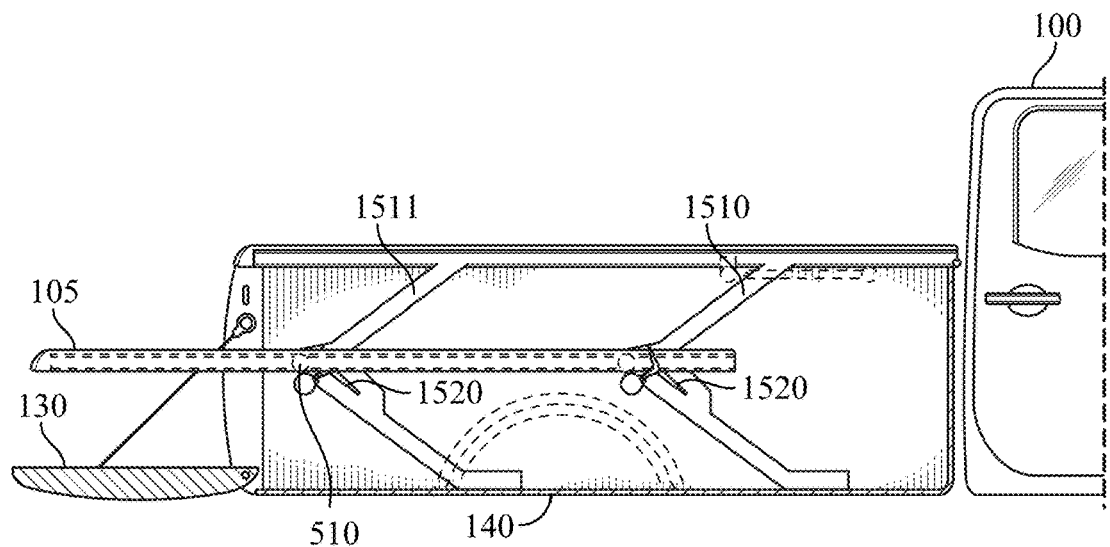
FIG. 30 shows a side internal view of an example truck coupled with a tonneau cover mechanism including the alternative switch of FIG. 19, with the tonneau cover in a transition state moving toward the top of the truck bed walls of the example truck, and prior to a connected wheel moving through the alternative switch, according to some embodiments.

FIG. 30 shows a side internal view of an example truck 100 coupled with a tonneau cover mechanism including the alternative switch of FIG. 19, with the tonneau cover 105 in a transition state (from position C towards position B) moving toward the top of the truck bed walls of the example truck 100, and prior to a connected wheel 510 moving through (rotating) the alternative switch, according to some embodiments.

Figure 31:
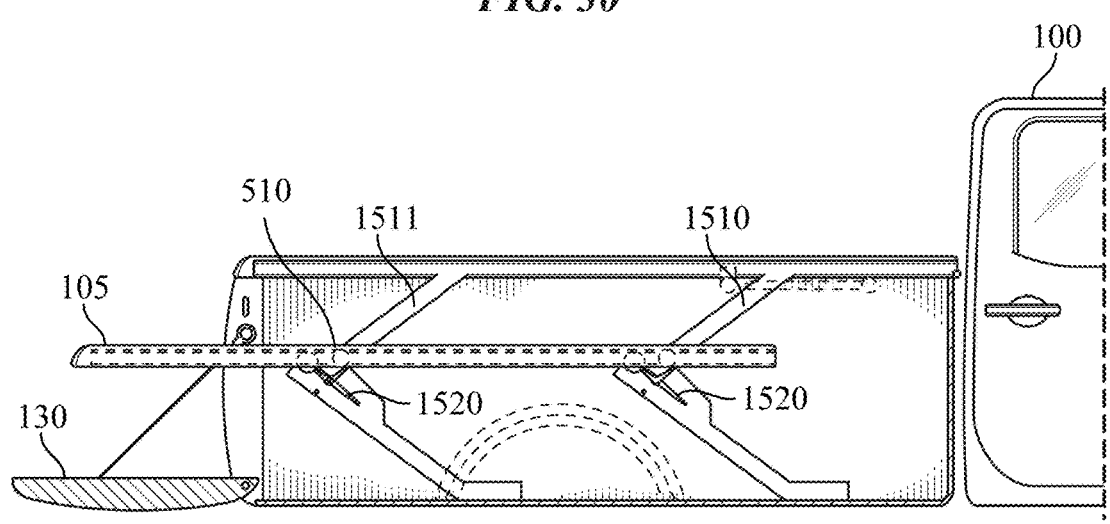
FIG. 31 shows a side internal view of an example truck coupled with a tonneau cover mechanism including the alternative switch of FIG. 19, with the tonneau cover in a transition state moving toward the top of the truck bed walls of the example truck, and after the connected wheel moved through the alternative switch, according to some embodiments.

FIG. 31 shows a side internal view of an example truck 100 coupled with a tonneau cover mechanism including the alternative switch of FIG. 19, with the tonneau cover 105 in a transition state (moving towards position B, exiting the alternative switch) moving toward the top of the truck bed walls of the example truck 100, and after the connected wheel 510 moved through the alternative switch, according to some embodiments.

Figure 32:
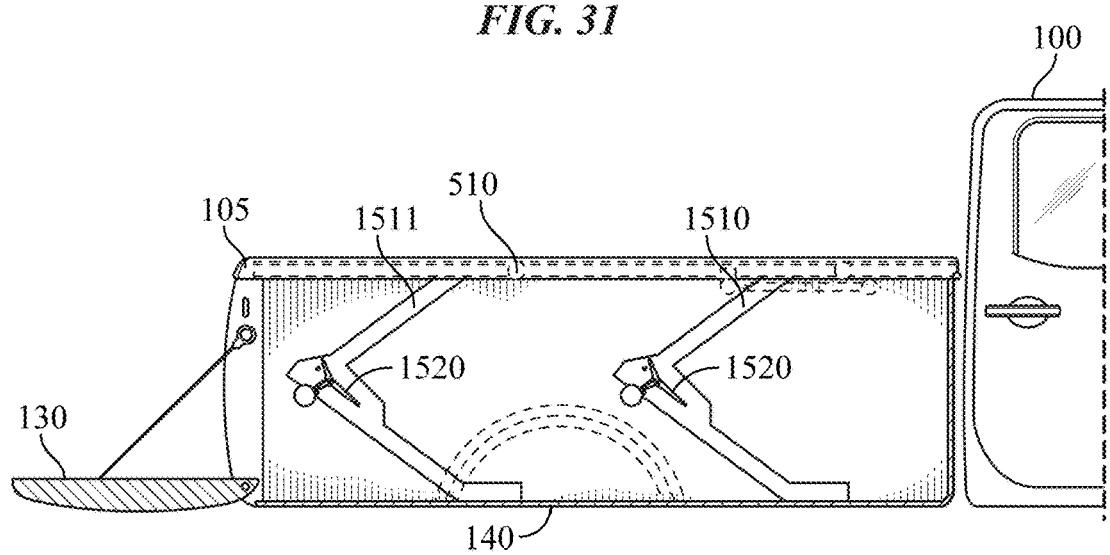
FIG. 32 shows a side internal view of an example truck coupled with a tonneau cover mechanism including the alternative switch of FIG. 19, with the tonneau cover in a cover state above the truck bed of the example truck, according to some embodiments.

FIG. 32 shows a side internal view of an example truck 100 coupled with a tonneau cover mechanism including the alternative switch of FIG. 19, with the tonneau cover 105 in a cover state (position B) above the truck bed 140 of the example truck 100, according to some embodiments.

In some embodiments, the tracks 120/121 or 1510 may be sized according to the change in position or height desired for the moveable platforms (e.g., the tonneau cover 105, FIG. 1). That is, the tracks 120/121 or 1510 may be longer or shorter depending on how much of a difference in change from a first position to a second lower position that is required for the moveable platform.

In one embodiment, the wheels 510 (see, e.g., FIG. 9) for the various embodiments may include friction bearings, friction mechanism, or other mechanism to control the speed of movement of a platform, depending on the requirements. In some embodiments, a tonneau cover 105 may be made of various materials and thickness, depending on use, requirements, desire, etc.

In some embodiments, the tonneau cover 105 (see, e.g., FIG. 1) may also be moveable in/out (e.g., moved off the example truck 100, FIG. 2) based on slots, channels or tracks built into the tonneau cover 105. This additional movement provides for the tonneau cover 105 to be moveable not only in and out over a truck bed, but also up and down using the switch 110 (see, e.g., FIGS. 10-18), or alternative switch shown in FIG. 19.

Figure 33:
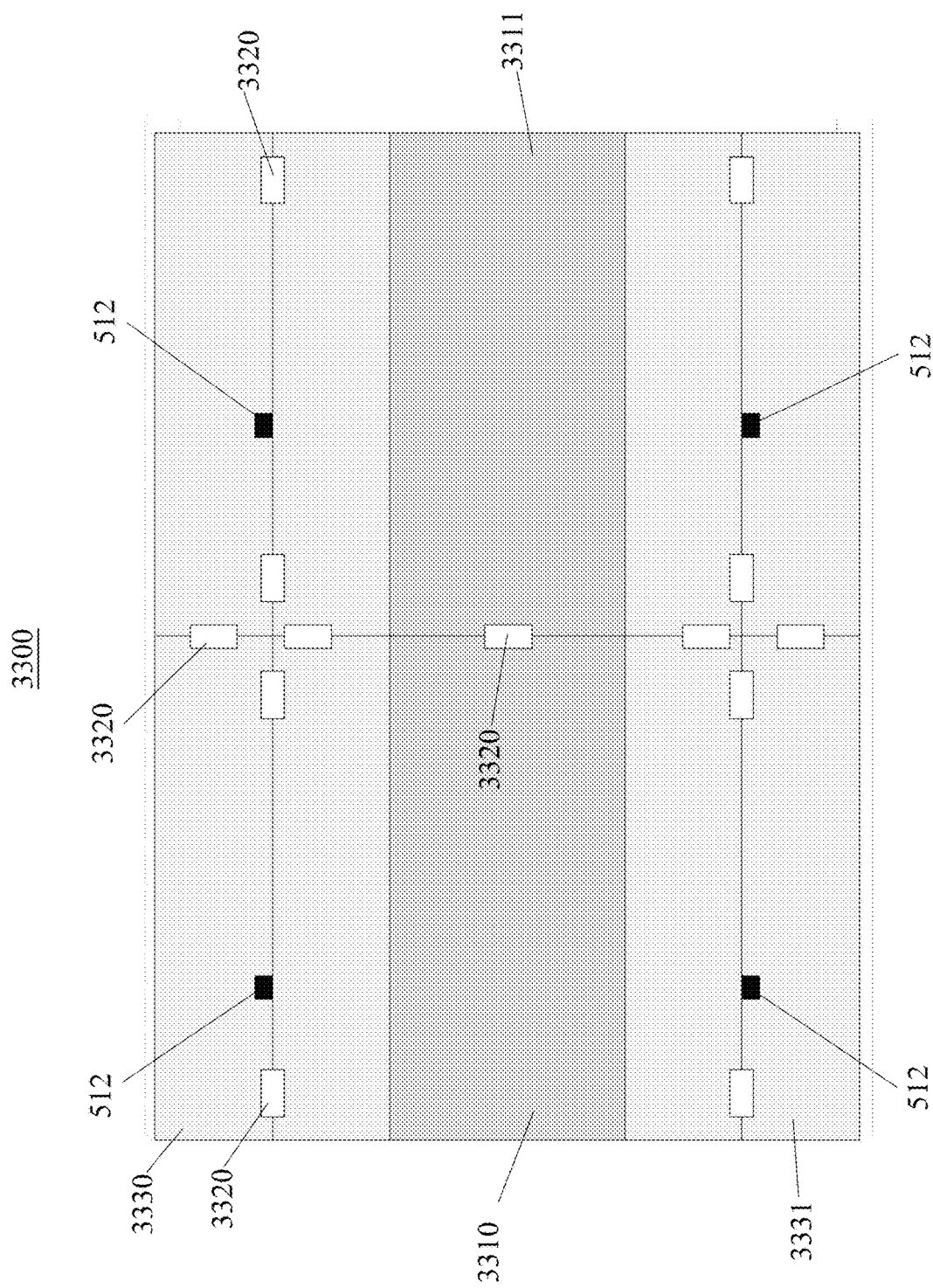
FIG. 33 shows a top view of a foldable tonneau cover, according to some embodiments.

FIG. 33 shows a top view of a foldable tonneau cover 3300, according to some embodiments. In one embodiment, the foldable tonneau cover 3300 includes a front portion 3310, a rear portion 3311, a first side portion 3330 and a second side portion 3331. Connecting the front portion 3310, the rear portion 3311, the first side portion 3330 and the second side portion 3331 are multiple hinges 3320. In one embodiment, the hinges 3320 provide for folding or rotating of the front portion 3310, the rear portion 3311, the first side portion 3330 and the second side portion 3331. In some embodiments, the foldable tonneau cover 3330 may include any number of hinges 3320, where the hinges 3320 may be singular hinges, continuous hinges (e.g., piano hinges), hidden hinges, etc. In some embodiments, the hinges 3320 are made from materials that are weather resistant, weatherproof, rust resistant, etc., and may be made of materials such as metals, metal alloys, hardened plastic, etc.

In one embodiment, the hinges 3320 between the front portion 3310 and the rear portion 3311 provide for either the front portion 3310 or the rear portion 3311 to rotate toward the opposite portion. This rotation provides for folding the front portion 3310 upwards and over onto the rear portion 3311, or for folding the rear portion 3311 upwards and over onto the front portion 3310. The rotation of either the front portion 3310 or the rear portion 3311 provides for lifting the foldable tonneau cover 3300 front portion 3310 or rear portion 3311 to provide access underneath either portion to a truck bed 140 (see, e.g., FIGS. 35-37). In one embodiment, the foldable tonneau cover 3300 disengages a locking element, the wheels 510 (see, e.g., FIG. 1) from the wheel housings 512, etc. from either the front portion 3310 or the rear portion 3311 from other components (e.g., the truck bed 140, sidewalls of the truck bed 140, tailgate 130, etc.) to provide for the rotation or lifting.

In some embodiments, the hinges 3320 between the first side portion 3330 and the front portion 3310 and rear portion 3311 provide for rotating or folding the first side portion 3330 towards the front portion 3310 and rear portion 3311, which provides for access to the sidewalls or storage compartments on the sides of the truck bed 140 underneath the first side portion 3330. Likewise, the hinges 3320 between the second side portion 3331 and the front portion 3310 and rear portion 3311 provide for rotating or folding the second side portion 3331 towards the front portion 3310 and rear portion 3311, which provides for access to the sidewalls or storage compartments on the sides of the truck bed 140 underneath the second side portion 3331.

In some embodiments, the hinges 3320 may be ratcheted or replaced with ratchet style connectors or hinged elements such that any of the front portion 3310, the rear portion 3311, the first side portion 3330, or the second side portion 3331 may be held in place by the ratcheting at several locked positions, which may be released to provide for returning to a closed/open or fully rotated position. In other embodiments, holding support arms, cords, chains, etc. may be used for holding open, at preselected or selectable positions, the different components of the foldable tonneau cover 3300.

In some embodiments, the rotating or folding of the first side portion 3330 and the second side portion 3331 inwards onto the first portion 3310 and the second portion 3311 conforms the foldable tonneau cover 3300 such that it fits within the side walls of the truck bed 140 so that the foldable tonneau cover 3300 may be manipulated to move to a lower position onto the truck bed 140 surface (see, e.g., similarly as per the tonneau cover 105, FIGS. 2-3). In some embodiments, the foldable tonneau cover 3300 may be made of similar materials as the tonneau cover 105.

Figure 34:
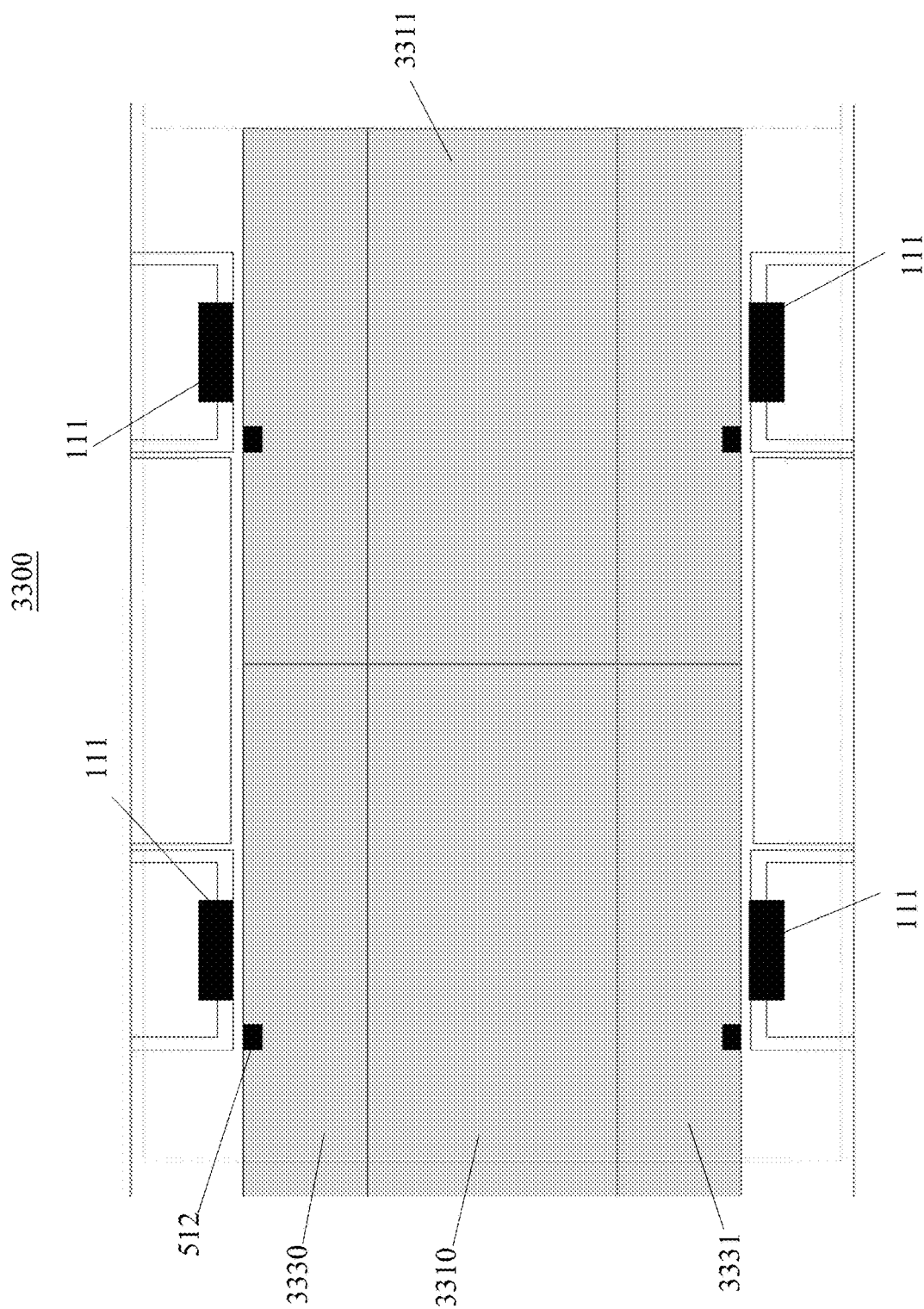
FIG. 34 shows a top view of the foldable tonneau cover of FIG. 33 shown in a truck bed position, according to some embodiments.

FIG. 34 shows a top view of the foldable tonneau cover 3300 of FIG. 33 shown in a truck bed position, according to some embodiments. In some embodiments, the foldable tonneau cover 3300 is sized to fit (e.g., designed to fit, depending on size and shape of a truck bed) onto the side walls and over the tailgate of a pickup truck bed 140 (see, e.g., FIGS. 35-37, and 41), and once the first side portion 3330 and second side portion 3331 are folded/rotated onto the front portion 3310 and rear portion 3311, onto the surface of the truck bed 140. In one embodiment, the turret switches 110 (see, e.g., FIGS. 1-8 and 10-32) are contained within a turret switch housing 111.

Figure 35:
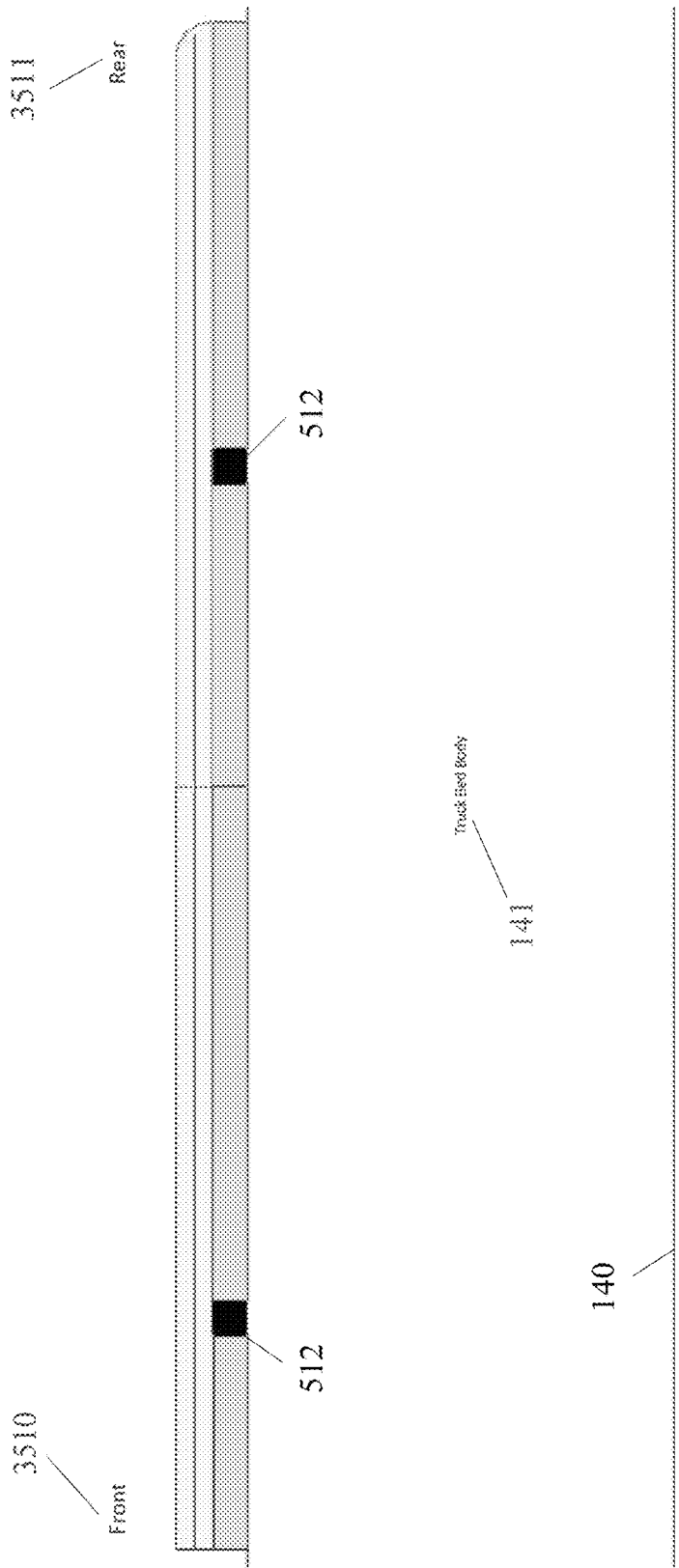
FIG. 35 shows a side view of the foldable tonneau cover of FIG. 33, according to some embodiments.

FIG. 35 shows a side view of the foldable tonneau cover 3330 of FIG. 33, according to some embodiments. As illustrated, the foldable tonneau cover 3330 is positioned on top of the side walls of the truck bed body 141. In one embodiment, the front portion 3510 has a different edge shape (e.g., squared) than the rear portion 3511 (e.g., rounded). In one embodiment, the front portion 3510 is placed towards the cab of a pickup truck and the rear portion 3511 is placed towards the tailgate of a pickup truck. In other embodiments, the shapes of the front portion 3510 and the rear portion 3511 may be the same (e.g., squared, rounded, etc.).

Figure 36:
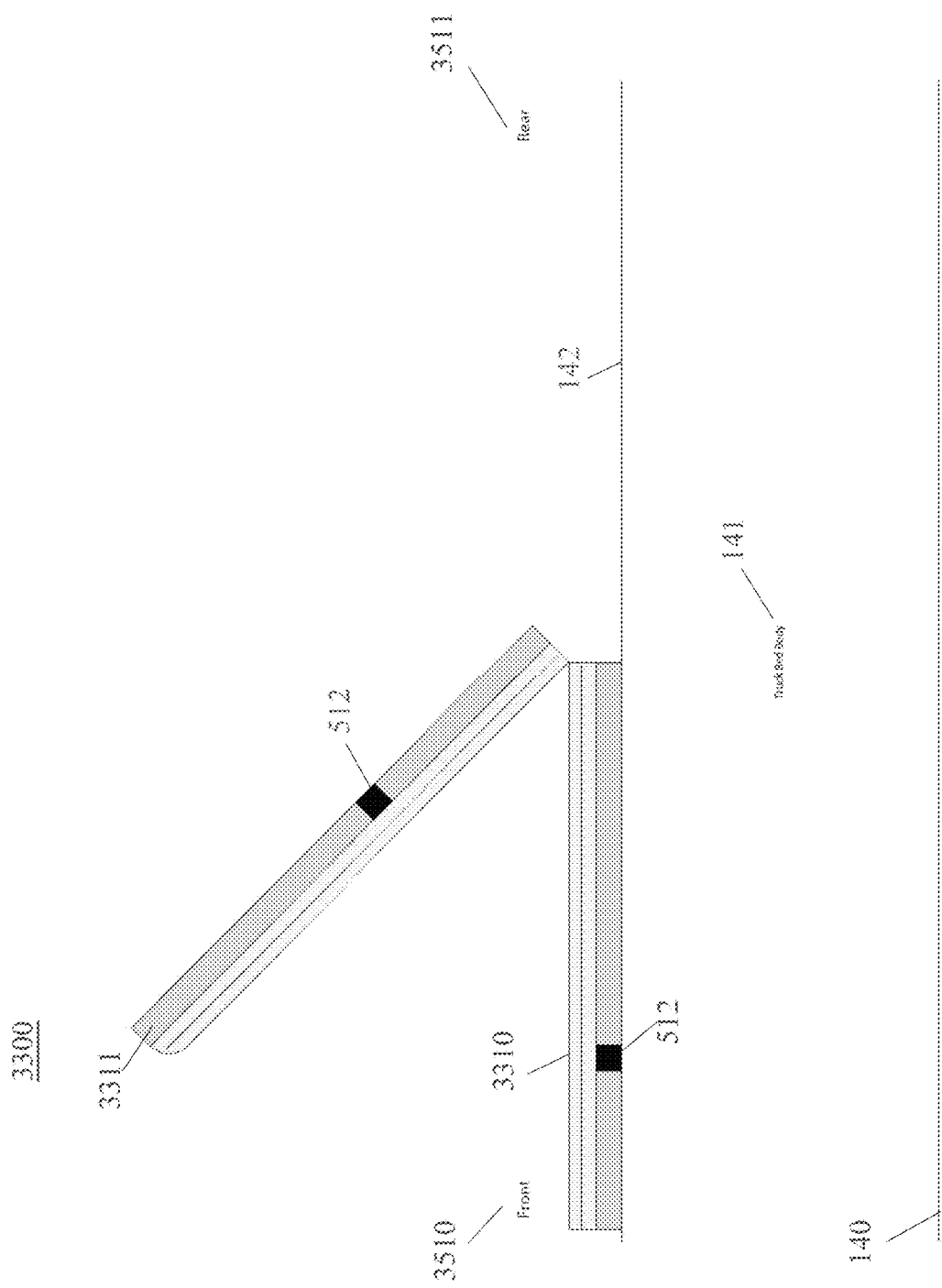
FIG. 36 shows the foldable tonneau cover of FIG. 33 in a folding state from rear to front, according to some embodiments.

FIG. 36 shows the foldable tonneau cover 3300 of FIG. 33 in a folding state from rear (the rear 3511 of a truck bed body 141) to front (the front 3510 of the truck bed body 141), according to some embodiments. As the rear portion 3311 is rotated or folded over the front portion 3310 towards the front, the top portion 142 of the side walls of the truck bed body 141 is exposed as is the portion of the truck bed 140 that was previously covered by the rear portion 3311. In one embodiment, the rear portion 3311 is securable to the front portion 3310 via a latch, a locking element, a strap, a clasp, etc. such that the foldable tonneau cover 3300 may be driven with the rear portion 3311 folded onto the front portion 3310. In other embodiments, the rear portion 3311 is not securable to the front portion 3310, but includes a safety strap or harness that is securable to a portion of the truck bed body 141 via an attachment (e.g., an attachable loop, connector, strap, hook and loop fasteners, etc.).

Figure 37:
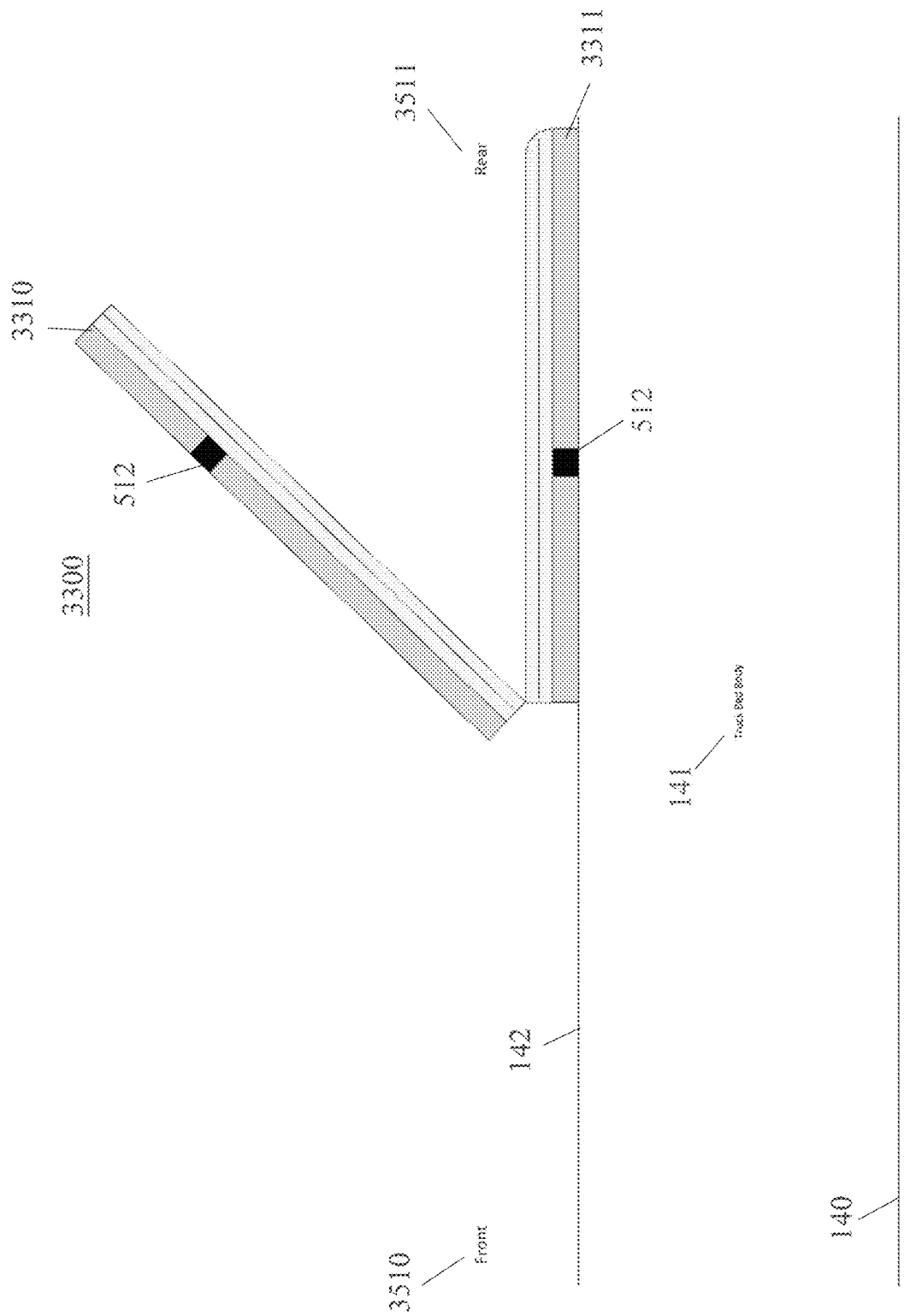
FIG. 37 shows the foldable tonneau cover of FIG. 33 in a folding state from front to rear, according to some embodiments.

FIG. 37 shows the foldable tonneau cover 3300 of FIG. 33 in a folding state from front (the front 3510 of the truck bed body 141) to rear (the rear 3511), according to some embodiments. As the front portion 3310 is rotated or folded over the rear portion 3311, the top portion 142 of the side walls of the truck bed body 141 is exposed as is the portion of the truck bed 140 that was previously covered by the front portion 3310. In one embodiment, the front portion 3310 is securable to the rear portion 3311 via a latch, a locking element, a strap, a clasp, etc. such that the foldable tonneau cover 3300 may be driven with the front portion 3310 folded onto the rear portion 3311. In other embodiments, the front portion 3310 is not securable to the rear portion 3311, but includes a safety strap or harness that is securable to a portion of the truck bed body 141 via an attachment (e.g., an attachable loop, connector, strap, hook and loop fasteners, etc.).

Figure 38:
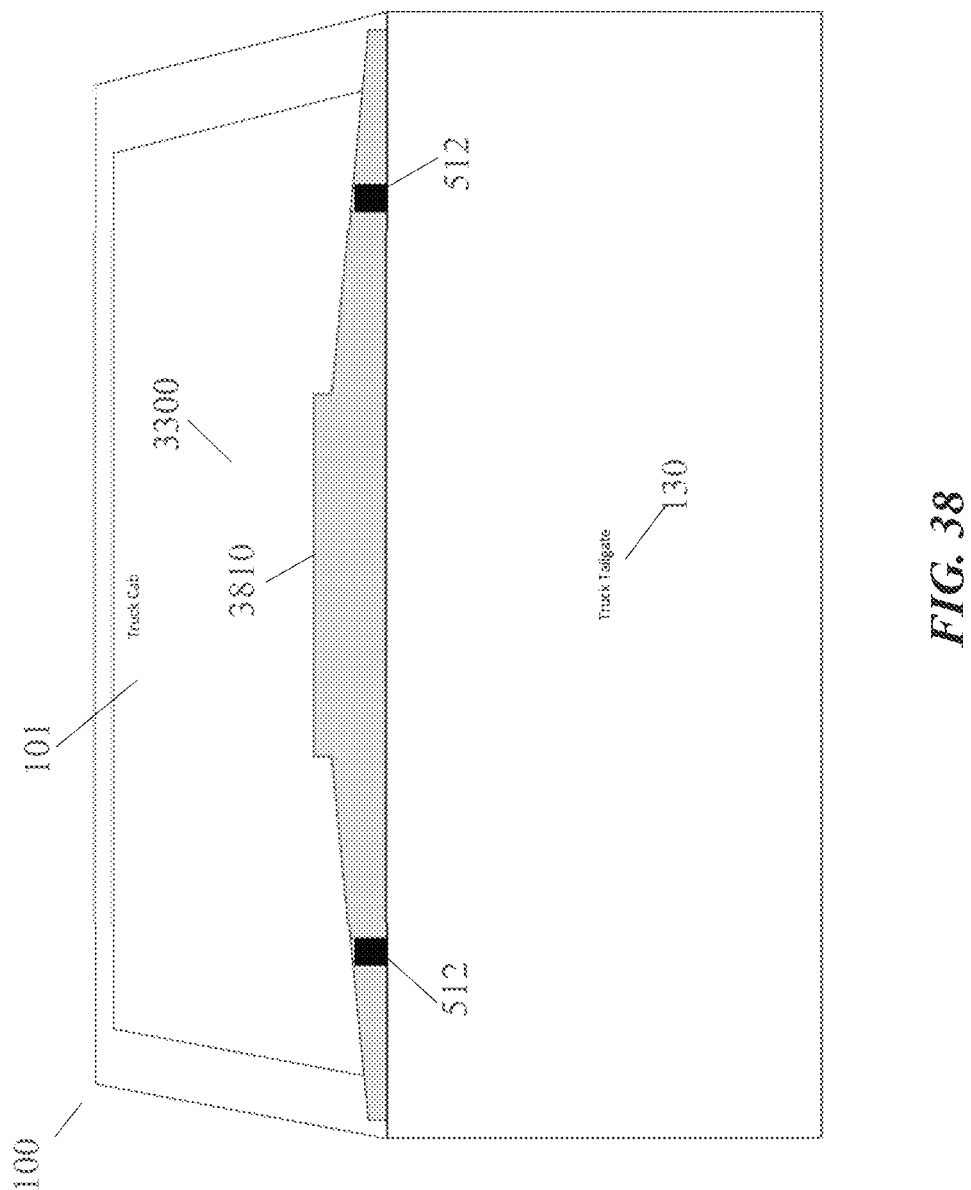
FIG. 38 shows the foldable tonneau cover of FIG. 33 shown in a first state on an example truck bed, according to some embodiments.

FIG. 38 shows the foldable tonneau cover 3300 of FIG. 33 shown in a first state (i.e., covering the space between the bottom of the truck bed 140 to the height of the sidewalls of the truck bed body 141 (see, e.g., FIGS. 36-37) and truck tailgate 130) on an example truck 100, according to some embodiments. In one embodiment, the shape of the top of the first side portion 3310 and the second side portion 3311 is angled such that it is congruous with a first angled portion 3340 (FIG. 39) and a second angled portion 3341 (FIG. 39) of the front portion 3310 and the rear portion 3311 that are also angled. When the first side portion 3310 is folded onto the front portion 3310 and the rear portion 3311, the height of the folded portion is equal to the center portion 3810 of the foldable tonneau cover 3300 (see, e.g., FIG. 40).

Figure 39:
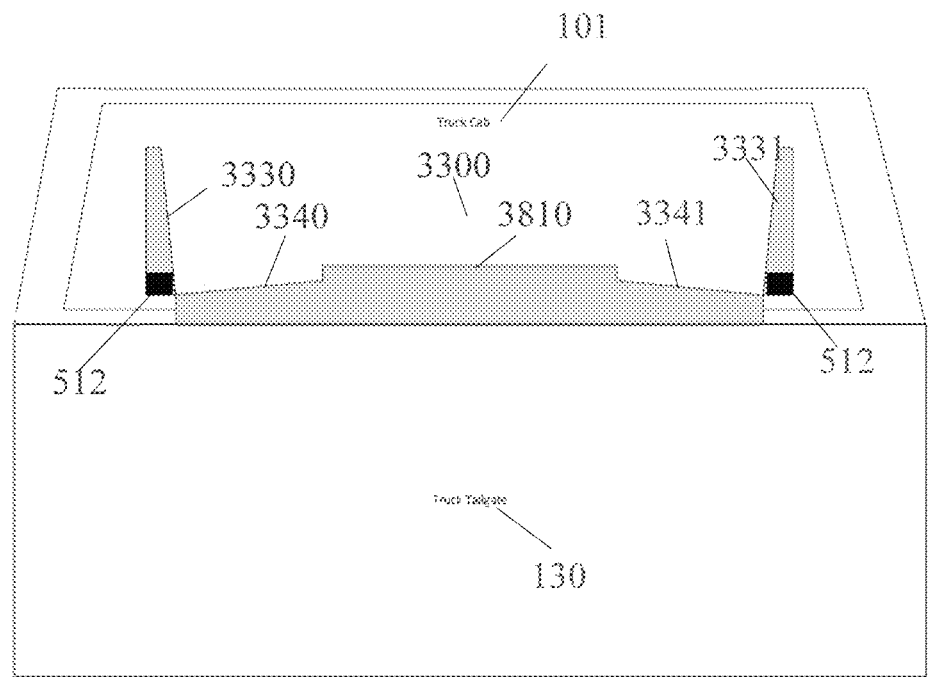
FIG. 39 shows the foldable tonneau cover of FIG. 33 shown in the first state on the example truck bed with side cover portions in a folding state, according to some embodiments.

FIG. 39 shows the foldable tonneau 3300 cover of FIG. 33 shown in the first state on the example truck bed with side cover portions (the first side portion 3330 and the second side portion 3331) in a folding/rotating state, according to some embodiments.

Figure 40:
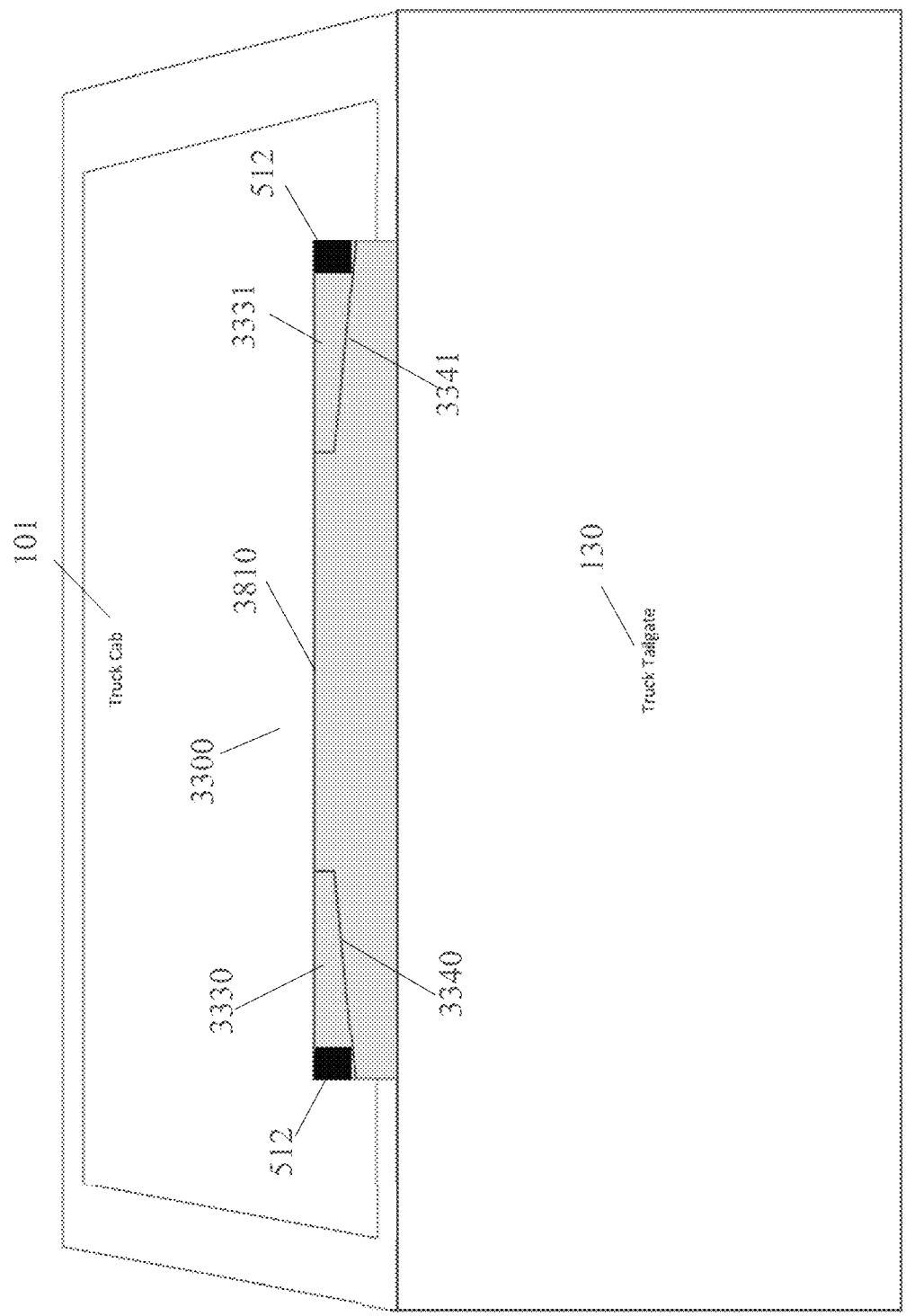
FIG. 40 shows the foldable tonneau cover of FIG. 33 shown in the first state on the example truck bed with the side cover portions in a folded state, according to some embodiments.

FIG. 40 shows the foldable tonneau cover 3300 of FIG. 33 shown in the first state on the example truck bed with the side cover portions (the first side portion 3330 and the second side portion 3331) in a folded state, according to some embodiments.

Figure 41:
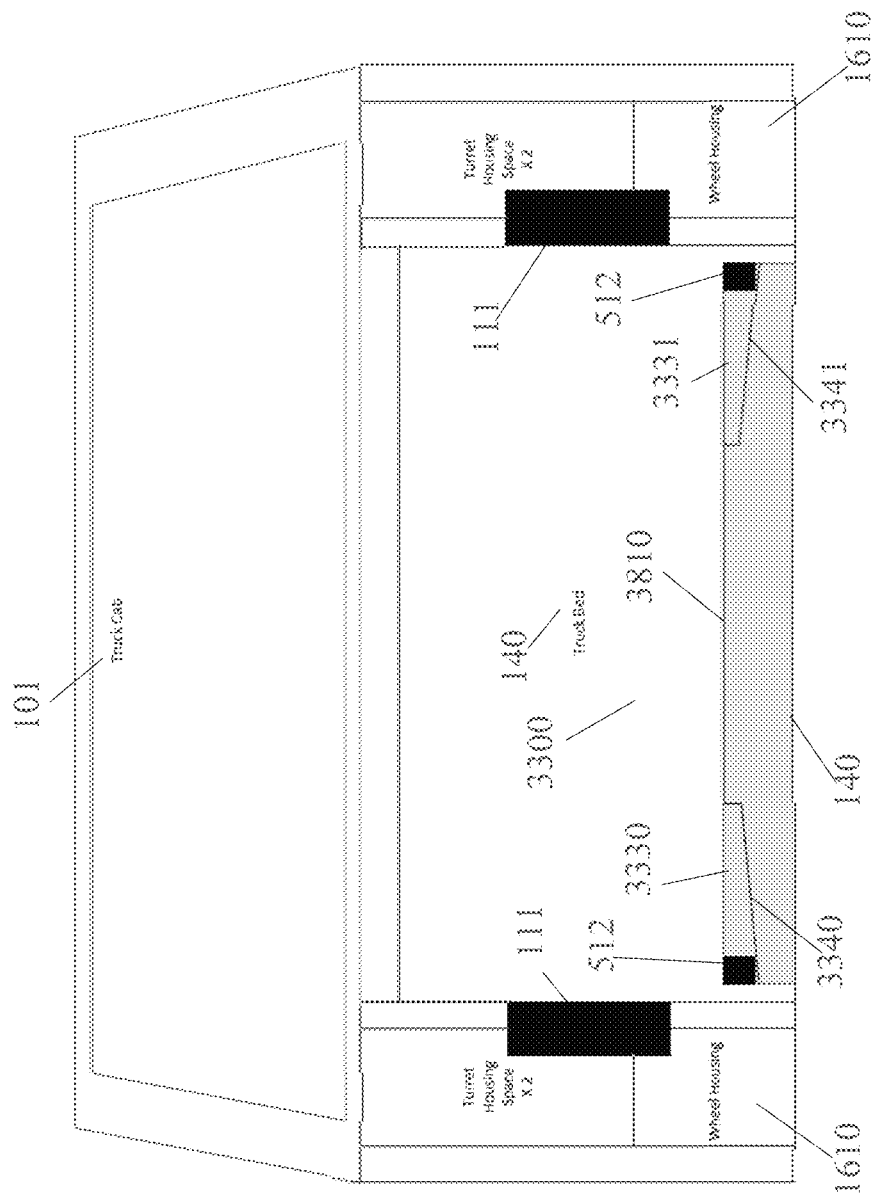
FIG. 41 shows the foldable tonneau cover of FIG. 33 shown in a second state on the example truck bed, according to some embodiments.

FIG. 41 shows the foldable tonneau cover 3300 of FIG. 33 shown in a second state on the example truck bed 140, according to some embodiments. In the configuration as shown, the foldable tonneau cover 3300 fits within the width of the available space between the sidewalls that may include the wheel housings 1610 for the rear wheels of the example truck. The foldable tonneau cover 3300 may then be used for handling loads on top of the foldable tonneau cover 3300 while in this second state without having to remove or lift the foldable tonneau cover 3300.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a moveable tonneau cover including a plurality of wheels and a plurality of hinge elements; and
a tonneau cover mechanism comprising:
a plurality of tracks each including an upper portion and a lower portion, and a switch that transitions to connect with the upper portion and the lower portion based on a weight of the moveable tonneau cover such that the moveable tonneau cover is configured to move between a first position above a truck bed and a second position above the first position.

2. The apparatus of claim 1, wherein the moveable tonneau cover includes a front portion, a rear portion, a first side portion and a second side portion, and the front portion, the rear portion, the first side portion and the second side portion are each rotatable based on the plurality of hinge elements.

3. The apparatus of claim 2, wherein the front portion includes a first angled portion and a second angled portion, and the rear portion includes a third angled portion and a fourth angled portion.

4. The apparatus of claim 3, wherein the first angled portion and the second angled portion are congruent with a fifth angled portion of the first side portion, and the third angled portion and a fourth angled portion are congruent with a sixth angled portion of the second side portion.

5. The apparatus of claim 1, wherein the tonneau cover mechanism further comprising a u-frame track configured to couple to side walls or side panels of the truck bed, the u-frame track is configured to house the plurality of wheels and transition the plurality of wheels from the u-frame track into the plurality of tracks, and each of the plurality of wheels includes a wheel axle that rotates and travels in and out a particular distance such that the plurality of wheels travel with ease in the u-frame track and each respective track of the plurality of tracks.

6. The apparatus of claim 5, wherein each wheel axle is coupled to the tonneau cover, the switch comprises a turret switch including a turret track, and the turret switch including a trigger coupled with a trigger weight and a cam, and a latch removably coupled with a receiver latch pin.

7. The apparatus of claim 6, wherein:
the switch further comprises a front plate and a back plate;
the trigger is disposed on top of the front plate;
the latch receiver pin is disposed in front of the back plate; and
the trigger weight, cam, and the latch are disposed behind the front plate.

8. The apparatus of claim 1, wherein the switch comprises a track divider and stop, a switch lever, a trigger weight and one or more stop pins.

9. A tonneau cover system comprising:
a moveable tonneau cover including two sets of wheels and a plurality of hinge elements; and
a tonneau cover mechanism comprising:
a plurality of wheel tracks each including an upper portion and a lower portion, and a switch coupled between the upper portion and the lower portion, the plurality of wheel tracks provides passage of a respective wheel based on a weight of the tonneau cover such that the moveable tonneau cover is configured to move between a first position on top of a truck bed and a second position above the first position.

10. The tonneau cover system of claim 9, wherein the moveable tonneau cover includes a front portion, a rear portion, a first side portion and a second side portion, and the front portion, the rear portion, the first side portion and the second side portion are each rotatable based on the plurality of hinge elements.

11. The tonneau cover system of claim 10, wherein the front portion includes a first angled portion and a second angled portion, and the rear portion includes a third angled portion and a fourth angled portion.

12. The tonneau cover system of claim 11, wherein the first angled portion and the second angled portion are congruent with a fifth angled portion of the first side portion, and the third angled portion and the fourth angled portion are congruent with a sixth angled portion of the second side portion.

13. The tonneau cover system of claim 9, wherein:
the tonneau cover mechanism further comprising a u-frame track configured to couple to side walls or side panels of the truck bed, the u-frame track is configured to house the two sets of wheels and transition the two sets of wheels from the u-frame track into the plurality of wheel tracks, and each wheel of the two sets of wheels includes a wheel axle that rotates and travels in and out a particular distance such that the two sets of wheels travel with ease in the u-frame track and each respective wheel track of the plurality of wheel tracks.

14. The tonneau cover system of claim 13, wherein:
each wheel axle is coupled to the tonneau cover, the switch comprises a turret switch including a turret track, and the turret switch including a trigger coupled with a trigger weight and a cam, and a latch removably coupled with a latch receiver pin.

15. The tonneau cover system of claim 14, wherein:
the switch further comprises a front plate and a back plate;
the trigger is disposed on top of the front plate;
the latch receiver pin is disposed in front of the back plate;
the trigger weight, cam, and the latch are disposed behind the front plate; and
the switch comprises a track divider and stop, a switch lever, a trigger weight and one or more stop pins.

16. A tonneau cover kit comprising:
two sets of wheels; and
a tonneau cover mechanism comprising:
an upper wheel track; and
a plurality of lower wheel tracks each including: an upper portion and a lower portion, a switch, coupled between the upper portion and the lower portion, the switch transitions to provide passage of a respective wheel between the upper portion and the lower portion based on a weight of a moveable tonneau cover that includes a plurality of hinges, wherein the moveable tonneau cover is configured to move between a first position on top of a truck bed and a second position above the first position.

17. The tonneau cover kit of claim 16, wherein:
the moveable tonneau cover includes a front portion, a rear portion, a first side portion and a second side portion, and the front portion, the rear portion, the first side portion and the second side portion are each rotatable based on the plurality of hinge elements.

18. The tonneau cover kit of claim 17, wherein the front portion includes a first angled portion and a second angled portion, and the rear portion includes a third angled portion and a fourth angled portion.

19. The tonneau cover kit of claim 18, wherein the first angled portion and the second angled portion are congruent with a fifth angled portion of the first side portion, and the third angled portion and a fourth angled portion are congruent with a sixth angled portion of the second side portion.

20. The tonneau cover kit of claim 18, wherein:
the upper wheel track is configured to couple to side walls or side panels of the truck bed, to house the two sets of wheels and transition the two sets of wheels from the upper wheel track into the plurality of lower wheel tracks;
each wheel of the two sets of wheels includes a wheel axle that rotates and travels in and out a particular distance such that the two sets of wheels travel with ease in the upper wheel track and each respective wheel track of the plurality of wheel tracks;
each wheel axle is coupled to the tonneau cover;
the switch comprises a turret switch including a turret track, and the turret switch including a trigger coupled with a trigger weight and a cam, and a latch removably coupled with a latch receiver pin;
the switch further comprises a front plate and a back plate;
the trigger is disposed on top of the front plate;
the latch receiver pin is disposed in front of the back plate;
the trigger weight, cam, and the latch are disposed behind the front plate; and
the switch comprises a track divider and stop, a switch lever, a trigger weight and one or more stop pins.

\* \* \* \* \*